United States Patent
Hotogi et al.

(10) Patent No.: US 8,867,047 B2
(45) Date of Patent: Oct. 21, 2014

(54) SWITCHING POWER SOURCE AND IMAGE FORMING APPARATUS

(75) Inventors: Tatsuya Hotogi, Susono (JP); Minoru Hayasaki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 13/599,940

(22) Filed: Aug. 30, 2012

(65) Prior Publication Data

US 2013/0057875 A1  Mar. 7, 2013

(30) Foreign Application Priority Data

Sep. 7, 2011  (JP) .................................. 2011-194965
Aug. 6, 2012  (JP) .................................. 2012-173755

(51) Int. Cl.
- G06F 3/12 (2006.01)
- G06K 15/00 (2006.01)
- H04N 1/60 (2006.01)
- H04N 1/36 (2006.01)
- H02M 3/335 (2006.01)

(52) U.S. Cl.
CPC .................................. H02M 3/335 (2013.01)
USPC ............ 358/1.1; 358/1.14; 358/1.9; 358/413

(58) Field of Classification Search
USPC .......... 358/1.1, 1.9, 1.14, 401, 413, 420, 422;
363/21.01, 21.04, 21.09, 21.1, 21.12,
363/21.18, 26, 37, 41, 42, 48, 52, 56.01, 35,
363/134, 131, 135; 323/20, 250, 206, 207,
323/210, 331, 361, 362, 308, 284, 221, 224,
323/225, 229, 232, 235, 244, 266, 271, 282,
323/287, 319, 337, 345, 355, 365, 364

See application file for complete search history.

(56) References Cited

U.S. PATENT DOCUMENTS

| | | | | |
|---|---|---|---|---|
| 4,980,811 A | * | 12/1990 | Suzuji et al. | ................ 363/21.07 |
| 2010/0034446 A1 | * | 2/2010 | Zhu et al. | ...................... 382/130 |
| 2010/0149840 A1 | * | 6/2010 | Hayasaki et al. | ........... 363/21.09 |
| 2011/0311259 A1 | * | 12/2011 | Hayasaki et al. | ................ 399/88 |

FOREIGN PATENT DOCUMENTS

| JP | 3567355 B2 | 9/2004 |
|---|---|---|
| JP | 3665984 B2 | 6/2005 |
| KR | 10-2010-0069581 A | 6/2010 |

OTHER PUBLICATIONS

Erickson, DC-DC Power Converters, Jun. 15, 2007, John Wiley & Sons Inc.,DOI: 10.1002/047134608X.W5808.pub2, all pages.*
Park, Design of AC/DC Conveter Control IC with Standby Power Reduction Function, Feb. 2009, pp. 1-87, dColletion.

* cited by examiner

*Primary Examiner* — Ngon Nguyen
(74) *Attorney, Agent, or Firm* — Canon USA, Inc., IP Division

(57) ABSTRACT

In a switching power source, in a state where a second voltage smaller than a first voltage is output from an output unit by intermittently driving a switching unit, the switching unit changes a number of driving times of the switching unit for each driving cycle when the switching unit is intermittently driven.

12 Claims, 22 Drawing Sheets

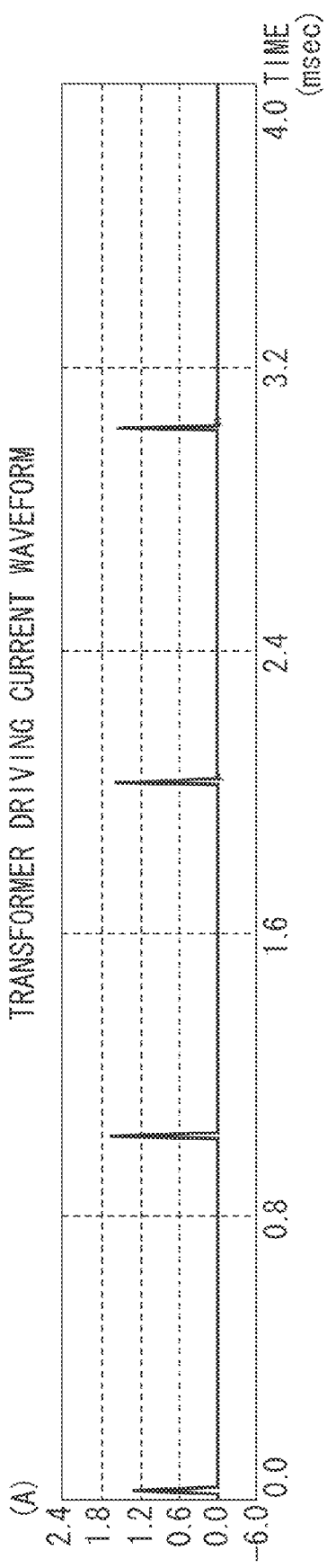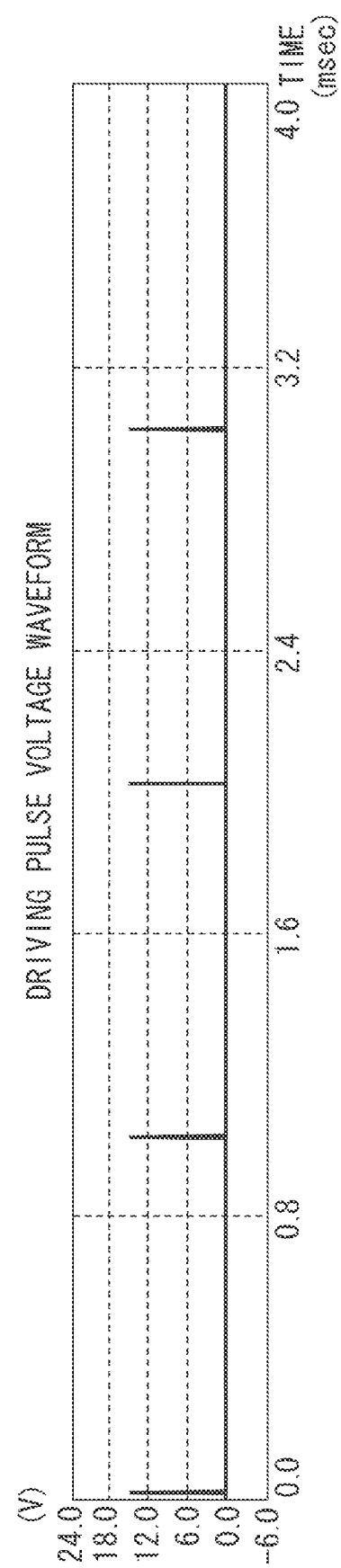

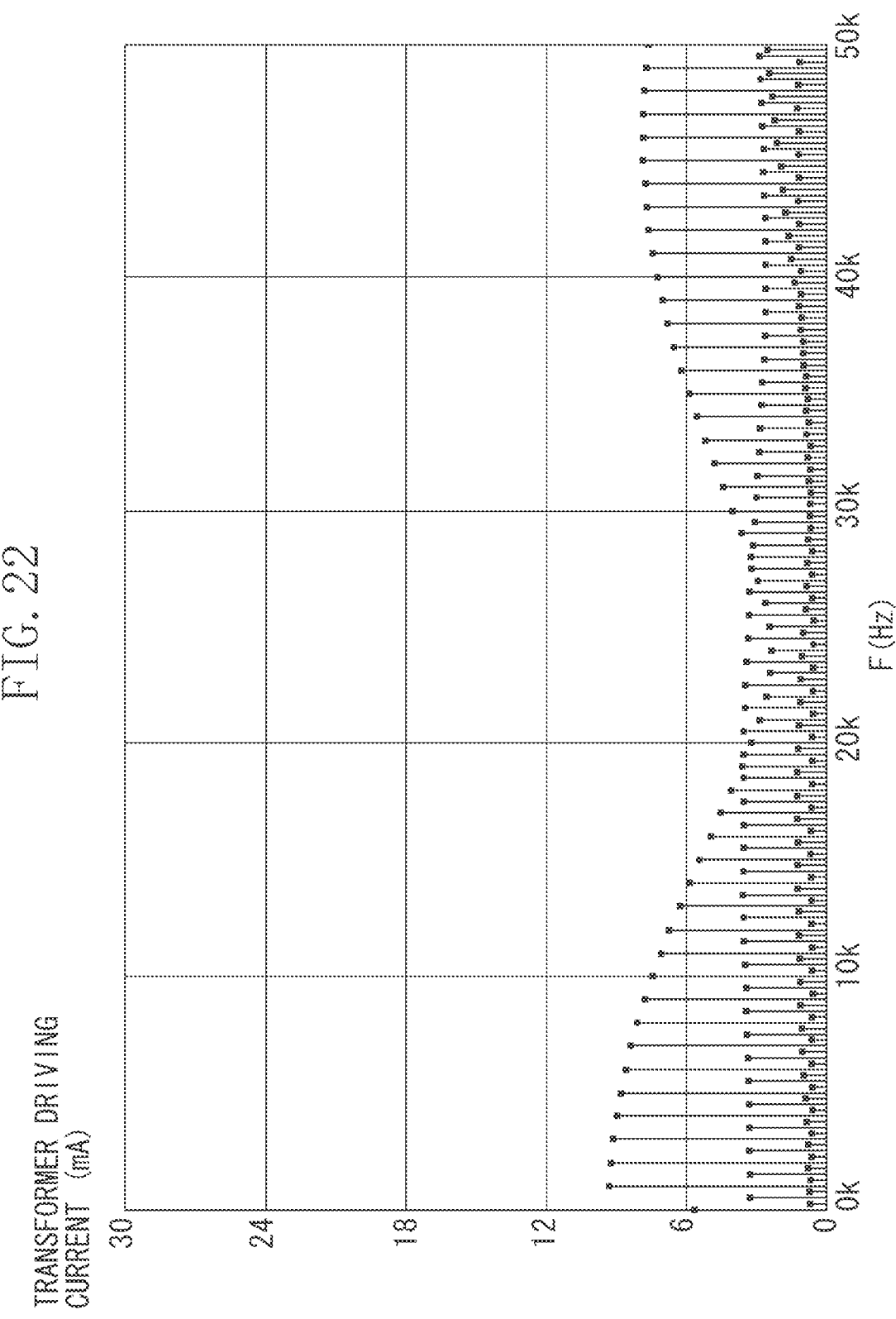

SWITCHING POWER SOURCE AND IMAGE FORMING APPARATUS

BACKGROUND OF THE INVENTION

1. Field of the Invention

The present invention relates to a switching power source that generates a direct-current (DC) voltage.

2. Description of the Related Art

With an increase in demand for power saving electronic devices that reduces power consumption in various fields in recent years, more power saving is also required of power sources which supply electrical power to the electronic devices. The schematic configuration diagram of a switching power source which is one example of power sources for electronic devices is illustrated in FIG. 15. In FIG. 15, an alternating-current (AC) voltage input from a commercial alternating current power source 100 is input into a transformer 104 via a rectification unit 140, and a switching element 108 such as a field effect transistor (FET) performs switching operation at a predetermined frequency, based on a signal sent out from a control circuit 144, thereby a primary side of the transformer 104 is driven. Then, the DC voltage V is generated by smoothing a voltage generated on a secondary side of the transformer 104 by a smoothing unit 141.

A switching power source that generates the desired DC voltage in this manner by driving the switching element 108 at the predetermined frequency is widely used. Among such switching power sources, there are some that improve operation efficiency by decreasing a number of switching times of the switching element 108 (by decreasing a switching frequency), for example, during power-saving operation (sometimes referred to as during light-load running) in which an electronic device is not operating.

Most of losses of the switching power source during the light-load running are losses of the switching operation, and in order to reduce the losses, energy for one switching operation is increased by prolonging a time during which the switching element 108 is ON (sometimes referred to as ON-period). Thus, it is being attempted to decrease the number of switching times per unit time by extending an idle (pause) period.

However, as the idle period is extended, the switching frequency is decreased much more, and there arises a possibility that a sound produced by the transformer associated with the switching operation comes into an audible range. Further, since this sound contains harmonic wave components, it becomes a sound disagreeable to the human ear.

Hereinbelow, the reason that the switching frequency results in a sound containing harmonic waves will be described. When the switching frequency becomes several kHz or less, the idle period of the switching element becomes longer. As a result, the driving current waveform of the transformer takes a delta-function waveform as illustrated in FIG. 16. In this case, FIGS. 16A and 16B illustrate transformer driving current waveforms, and driving pulse waveforms, when the switching element is driven by a 1-wave driving pulse with a cycle of 1 msec, and ON-period of 5 μsec. FIG. 16A illustrates the driving current waveforms of the transformer, in which the vertical axis indicates transformer driving current (A) and horizontal axis indicates time (sec). FIG. 16B illustrates the driving pulse waveforms, in which the vertical axis indicates drive voltage (V) and the horizontal axis indicates time (sec). The results of the frequency analysis (Fast Fourier Transform analysis (sometimes referred to as FFT analysis)) performed on such the transformer driving current waveforms are illustrated in FIG. 17.

In FIG. 17, the vertical axis indicates transformer driving current (mA), and the horizontal axis indicates frequency (Hz). As illustrated in FIG. 17, the transformer driving current, with the switching frequency set as a fundamental wave, has harmonic wave components with a multiplied frequency. The transformer driving current takes a current waveform having energy driven by the harmonic wave components. Further, the transformer of the switching power source is also driven at a predetermined resonance frequency as the switching operation. Mechanical resonance frequency of the transformer is also dependent on a core shape of the transformer, and generally, has a peak of the resonance frequency within a frequency band of several kHz to several tens of kHz.

For example, as illustrated in FIG. 16, one wave driving pulse is applied to the switching element, and the device is driven with use of a transformer having a resonance level at which mechanical resonance frequency is close to a frequency band having a peak approximately at 18 kHz. Sound pressure of the beat sound produced from the transformer at this time is illustrated in FIG. 18.

In FIG. 18, the vertical axis indicates sound pressure (dB) of the beat sound of the transformer, and the horizontal axis indicates frequency (Hz), wherein sound pressure contains harmonic waves where the envelope exhibits mechanical resonance frequency characteristics of the transformer, with the switching frequency set as a fundamental wave. In other words, when the switching frequency and the mechanical resonance frequency of the transformer overlap each other, a disagreeable sound to the ear is generated, which comes into the audible range as the beat sound from the transformer.

As one of methods for reducing the production of such the beat sound from the transformer, a method for reducing the beat sound by suppressing a magnetic field change rate of the transformer is known. Conventionally, to suppress the magnetic field change rate of the transformer, there has been employed a method of using the transformer with a core material having a large sectional area, or reducing a switching current of the transformer per one operation by shortening ON-period of the switching element.

Further, as a method for reducing the production of the beat sound of the transformer by devising the transformer driving current waveforms, a soft start circuit is provided in a switching power source, and duty ratio is gradually changed at the time of ramp-up and ramp-down of a voltage of both ends of the capacitor during startup operation. If the current wave is formed such that a size of the transformer driving current waveform is gradually increased, or gradually decreased, magnetic flux change of the transformer can be decreased, and as a result, the production of the beat sound can be reduced. Such conventional schemes are discussed in, for example, Japanese Patent No. 3567355 and Japanese Patent No. 3665984.

However, if a core material having a large sectional area is used for the transformer, it becomes difficult to reduce size of the power source. Further, in a method of shortening ON-period of the switching element, although the production of the beat sound of the transformer is reduced by decreasing the magnetic flux change of the transformer, a number of switching times per unit time will be increased, and switching losses will be increased.

Further, in the case of the method of gradually increasing, or gradually decreasing the amplitude of the transformer driving current waveform by the soft start, during the light-load running, when power consumption is to be more reduced, application of the soft start becomes difficult, since energy supplied to a secondary side load becomes less. This is because, if energy supplied to the secondary side becomes less during the light-load running, it becomes difficult to gradually increase or decrease the amplitude of the current waveform by the soft start circuit.

Furthermore, in the conventional method, switching must be performed more times by reducing energy supplied in one switching operation, or the capacitance of a capacitor on the secondary side must be increased to be severalfold without changing the energy supplied in one switching operation. The former method increases switching losses, greatly lowering efficiency. The latter method increases product costs. In other words, in the switching power source, the switching losses are desirably reduced by decreasing the number of switching time. However, in this case, energy per wave which is applied to the transformer by a driving pulse is increased, and a greater sound is generated.

SUMMARY OF THE INVENTION

The present invention is directed to a switching power source that can reduce the beat sound generated by the transformer during the light-load running of the switching power source without increasing a size of the transformer and without increasing switching losses.

According to an aspect of the present invention, a switching power source includes a transformer, a switching unit configured to drive a primary side of the transformer, an output unit configured to output a voltage produced on a secondary side of the transformer, a first output condition which outputs a first voltage from the output unit by continuously driving the switching unit, and a second output condition which outputs a second voltage smaller than the first voltage from the output unit by intermittently driving the switching unit. In the second output condition, a number of driving times of the switching unit is changed for each driving cycle when the switching unit is intermittently driven.

According to another aspect of the present invention, an image forming apparatus includes an image forming unit configured to form an image, a control unit configured to control an operation of the image forming unit, and a switching power source configured to supply power to the control unit. The switching power source includes a transformer, a switching unit configured to drive a primary side of the transformer, an output unit configured to output a voltage produced on a secondary side of the transformer, a first output condition which outputs a first voltage from the output unit by continuously driving the switching unit, and a second output condition which outputs a second voltage smaller than the first voltage from the output unit by intermittently driving the switching unit, wherein, in the second output condition, the switching unit changes a number of driving times of the switching unit for each driving cycle when the switching unit is intermittently driven.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 16 illustrates transformer driving current waveforms and driving pulse waveforms during the light-load running of the conventional switching power source.

FIG. 22 illustrates frequency analysis results relating to the modified example 2 of the varying method for number of pulses.

DESCRIPTION OF THE EMBODIMENTS

Figure 1:
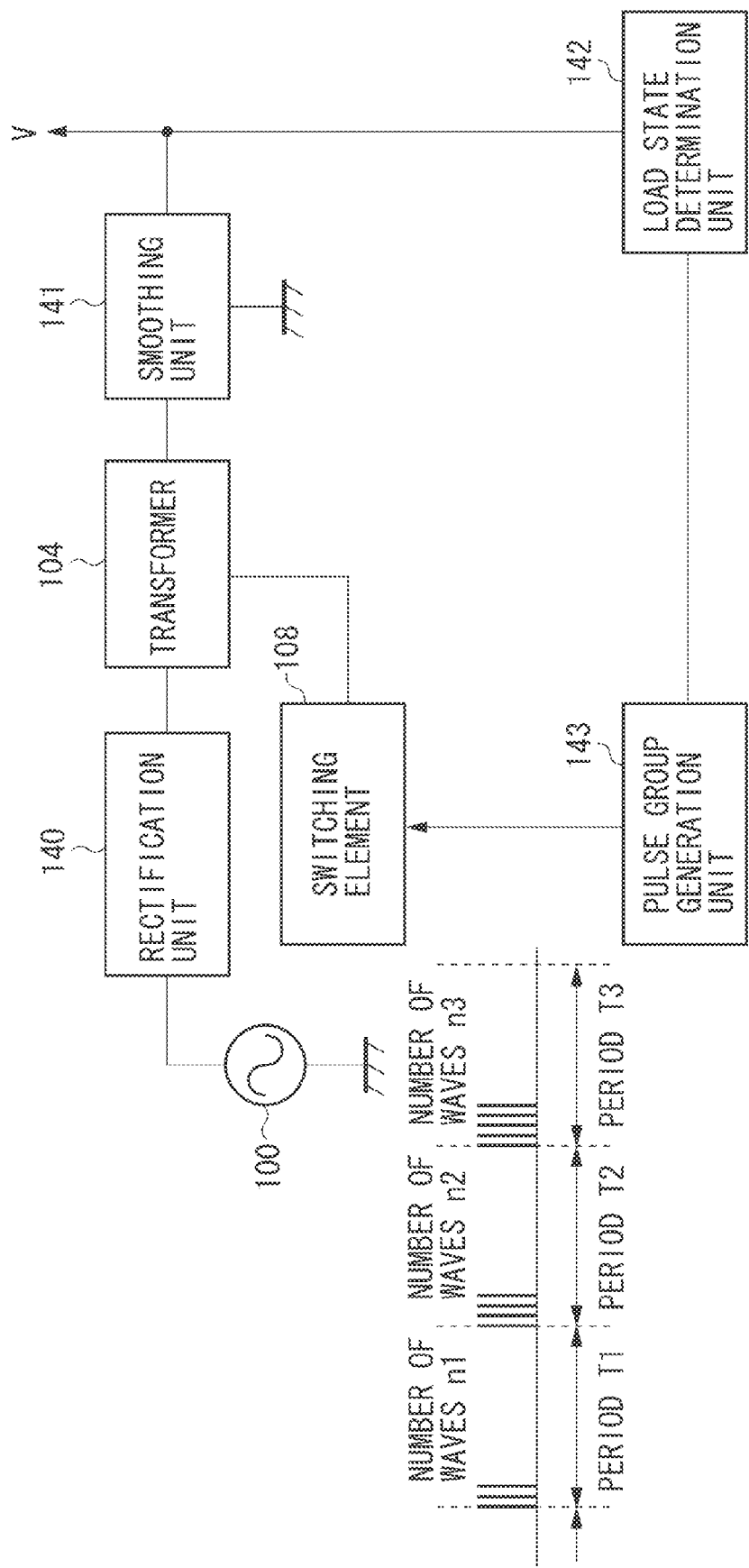
FIG. 1 illustrates a schematic configuration diagram of a switching power source according to a first exemplary embodiment.

Various exemplary embodiments, features, and aspects of the invention will be described in detail below with reference to the drawings.

Hereinbelow, configurations and operations according to the present invention will be described. The exemplary embodiment or exemplary embodiments illustrated below are only examples, and are not intended to limit the technical scope of the present invention only to these.

First, a first exemplary embodiment will be described with reference to FIG. 1 through FIG. 11. In the drawings, the same reference numerals are assigned to the elements similar to the above-described conventional examples, and therefore descriptions thereof will not be repeated.

FIG. 1 illustrates a configuration concept of the switching power source according to the present exemplary embodiment. The feature of FIG. 1 is a switching power source that generates a direct current (DC) voltage V from an AC voltage from a commercial alternating-current power source 100, employing a rectification unit 140, a transformer 104 driven by a switching element 108, a smoothing unit 141, a load condition determination unit 142, and a pulse group generation unit 143.

If the load condition determination unit 142 determines that the switching power source is in the light-load running condition, the pulse group generation unit 143 performs switching operation of the switching element 108 in predetermined cycles (T1, T2, T3 . . . ) including the idle periods (the operation is sometimes referred to as a burst operation). Then, a number of pulses in the driving pulse group is varied as shown in a predetermined number of waves (n1, n2, n3 . . . ). By such switching operation, a level of the FFT spectrum of the transformer driving current waveforms is reduced, with respect to a wide range of frequency band. Accordingly, the production of the beat sound of the transformer can be reduced without increasing the size of the transformer and without increasing the switching losses.

Figure 2:
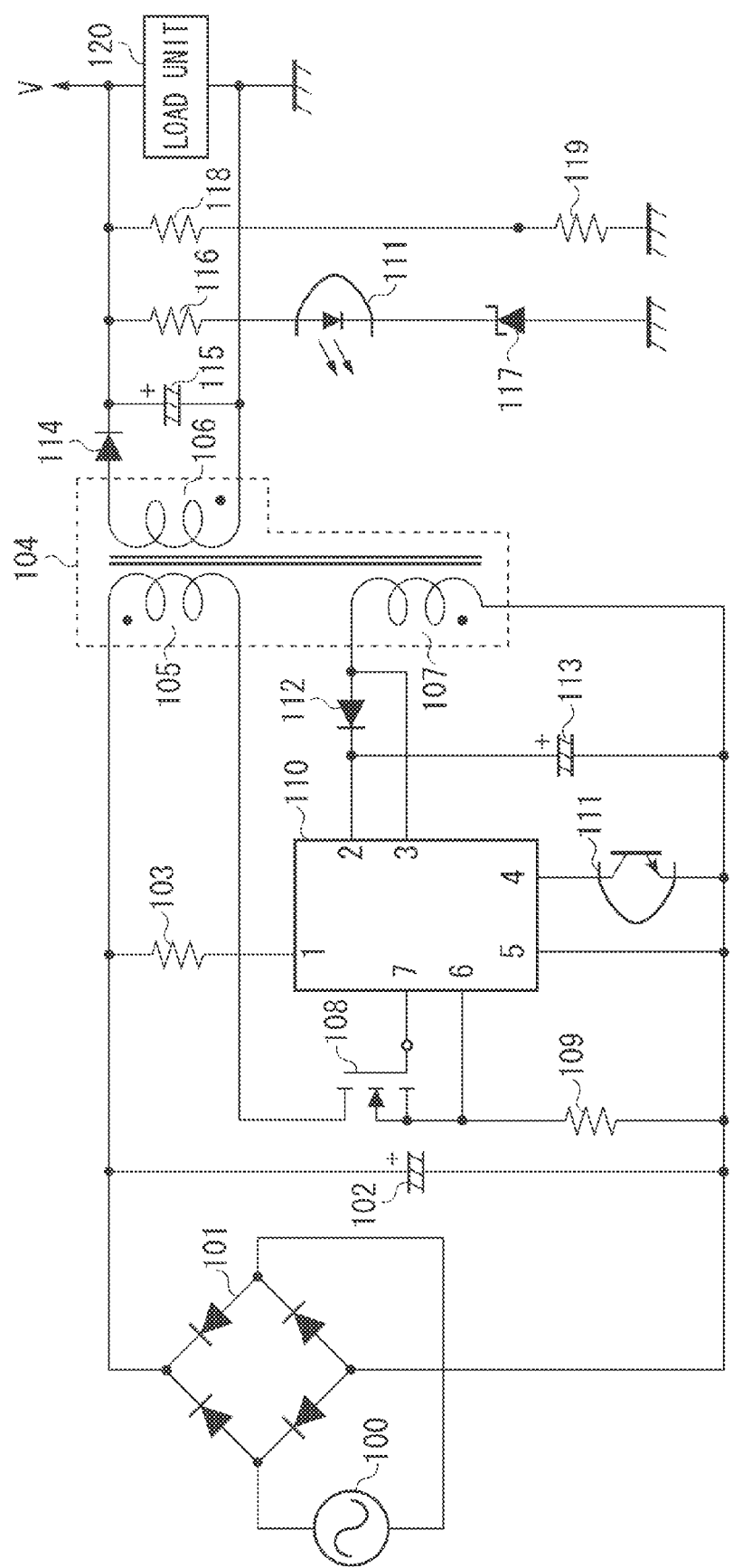
FIG. 2 illustrates a basic configuration of the switching power source.

First, the detailed configuration of the switching power source according to the present exemplary embodiment will be described. FIG. 2 illustrates a configuration of the switching power source according to the present exemplary embodiment. The switching power source illustrated by an example in the present exemplary embodiment is a switching power source of a pseudo-resonance method. In FIG. 2, the switching power source includes a commercial alternating current power source 100, a diode bridge 101, a primary electrolytic capacitor 102, a starting resistance 103, a transformer 104, a primary winding 105 of the transformer, a secondary winding 106 of the transformer, and an auxiliary winding 107 of the transformer. Further, a field effect transistor (FET) 108 is a main switching element that turns power supply to the transformer 104 on and off.

The switching power source further includes a current detection resistance 109, a switching control IC (hereinafter, written as IC) 110, a photocoupler 111 as a signal transmission unit that transmits a signal to the primary side of the transformer from the secondary side of the transformer, a diode 112, and an electrolytic capacitor 113, a diode 114 connected to the secondary winding 106 of the transformer, an electrolytic capacitor 115, resistances 116, 118, and 119, a series regulator 117, and a load unit 120. As an example of the IC 110, the IC for pseudo-resonance control generally in use will be described.

In the present exemplary embodiment, a transformer of an EER type is used as the transformer 104. The transformer 104 of the EER type is manufactured through a process of dipping the transformer into in a liquid in which a resin of wax or varnish has been dissolved, and then drying the transformer. Generally, a beat sound of the impregnated transformer is smaller than that of an unimpregnated transformer, and a coil bobbin and a core can stably be fixed. In many cases, the impregnation processing is performed in a state where the coil is wound on the coil bobbin and the core is assembled to be fixed by a core tape. Characteristics of the transformer 104 applied to the present exemplary embodiment are similar to those described in the above conventional example, and its mechanical resonance frequency characteristics have a resonance level around a frequency band around 18 kHz, having a peak approximately at 18 kHz.

Figure 3:
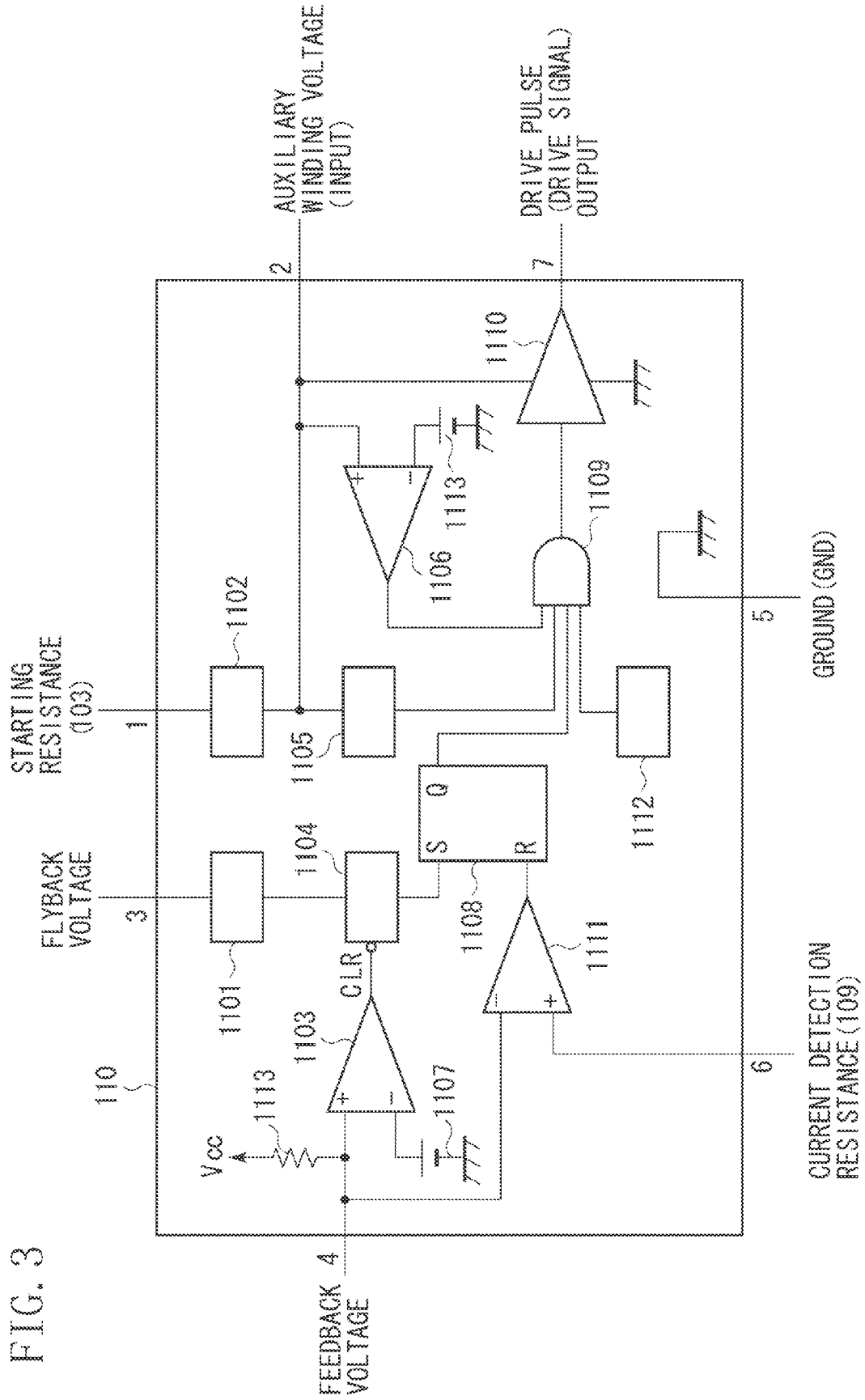
FIG. 3 illustrates an internal configuration of control IC of the switching power source.

FIG. 3 illustrates a block diagram of an internal circuit configuration of the IC 110 in FIG. 2. In FIG. 3, a terminal 1 is a starting terminal, and a power source circuit 1102 has a high-voltage switch (not illustrated). If a voltage supplied from a terminal 2 serving as a power terminal (a voltage supplied from the auxiliary winding 107 in FIG. 2) is low, turns on the high-voltage switch, and operates by power supplied via the starting resistance 103 provided outside the IC 110. When the FET 108 (FIG. 1) performs switching operation, a voltage is supplied from the auxiliary winding 107 of the transformer, and a voltage of the terminal 2 rises, and stable voltage is supplied. Then, the IC 110 shuts off voltage supply (voltage supply by the starting resistance) from the terminal 1, and can operate only by power supply from the terminal 2.

A terminal 3 is a terminal that detects a lower limit of a flyback voltage, namely, a fall of the flyback voltage. A circuit 1101 for detecting a lower limit of flyback voltage, upon detecting the fall of the flyback voltage, outputs a signal to a one-shot circuit 1104. A flip flop 1108 performs setting for outputting a signal when the lower limit of the flyback voltage is detected from the one-shot circuit 1104, and performs reset operation by an output of a comparator 1111, namely, operates to stop the output. In this way, the IC 110 outputs a driving pulse (a signal to a gate of the FET 108) from a terminal 7, in synchronization with timing at which the flyback voltage input into the terminal 3 reaches the lower limit, and turns on the FET 108.

A terminal 4 is a feedback voltage terminal, and is connected, pulled up by a resistance 1113, to a reference power source Vcc inside the IC 110, and is connected to a comparator 1103, and the comparator 1111. The comparator 1103 is connected to a reference voltage 1107, and clears the one-shot circuit 1104 when a voltage of the terminal 4 becomes lower than the reference voltage 1107. Therefore, the IC 110 becomes unable to turn on the FET 108, for a period that the voltage of the terminal 4 is lower than the reference voltage 1107, and the reference voltage 1107 becomes a pulse stop voltage.

A terminal 5 is a ground terminal (GND terminal), and a terminal 6 is a current detection terminal. The terminal 6 is input into the comparator 1111, and compared with a feedback voltage of the terminal 4. When a detection value becomes larger than the feedback voltage, the comparator 1111 operates to make a reset terminal of the flip flop 1108 high. In this way, when a current of the primary winding 105 of the transformer increases, and a voltage from the current detection resistance 109 rises, the comparator 1111 operates to turn off the FET 108.

A comparator 1106 is used to monitor a power supply voltage, and is a circuit that protects the IC 110 from outputting a driving pulse, when a voltage of the terminal 2 is lower than the reference voltage 1113. Further, a circuit 1105 generates a reference voltage inside the IC 110, and is connected to an AND circuit 1109 so as to permit an output of the terminal 7, by defining the reference voltage. A safety circuit 1112 is configured to stop an output from the terminal 7, when an abnormal current waveform is produced by the influence of an internal temperature of the IC 110.

When power is turned on, the IC 110 connects an internal circuit of the terminal 1 to the starting resistance 103, and receives voltage supply via the starting resistance 103. The IC 110 outputs High to the terminal 7, and turns on the FET 108. At this time, since voltage has not yet been produced across the electrolytic capacitor 115, or only a low voltage has been produced (accumulated), a photo LED of a photocoupler 111 is not lit, and a photo transistor of the photocoupler 111 is not turned on. Consequently, a voltage of the terminal 4 is maintained high, and the IC 110 continues High output from the terminal 7 until the current of the primary winding 105 of the transformer becomes high, and the FET 108 continues to be turned on.

Then, the IC 110 compares a voltage of the terminal 4 with a voltage of the terminal 6, namely, between the feedback voltage and a voltage generated across the current detection resistance 109. When the voltage of the terminal 6 becomes higher than the voltage of the terminal 4, the IC 110 turns off the FET 108. When the FET 108 is turned off, electrical current is generated through the secondary winding 106 of the transformer in a charging direction in which the electrolytic capacitor 115 is charged via the diode 114, and the electrolytic capacitor 115 is charged.

The charging current is decreased as energy of the transformer 104 is released. When the transformer 104 finishes the release of energy, a voltage of the transformer secondary winding 106 becomes lower than a voltage of the electrolytic capacitor 115, and conduction of the diode 114 ceases. Then, a voltage of a drain terminal of the FET 108 also falls, and the voltage commences free oscillation around a voltage of the primary electrolytic capacitor 102.

A voltage waveform having similarity with the freely oscillating voltage appears on the auxiliary winding 107 of the transformer and the voltage of the terminal 3 falls. The terminal 3 is provided with a function of detecting a lower limit of the flyback voltage, and the terminal 7 of the IC 110 shows High output to turn on the FET 108. In this way, turn-on and turn-off of the FET 108 are repeated, and the driving pulses are continuously output from the terminal 7 to drive the primary winding 105 of the transformer.

Further, when the electrolytic capacitor 113 is charged by a voltage generated on the auxiliary winding 107 of the transformer, and is raised to a sufficient voltage as the power of the IC 110, the IC 110 stops receiving power supply from the terminal 1, and operates only by the power supply from the terminal 2 (voltage from the auxiliary winding).

Further, when the DC voltage V, which has been produced, rectified and smoothed on the secondary side of the transformer 104, rises and approaches a predefined threshold value voltage, the shunt regulator 117 operates to cause electrical current to start flowing through the photo LED of the photocoupler 111. Then, the feedback voltage of the terminal 4 drops and a maximal current value during turn-ON-period of the FET 108 is lowered. Since turn-ON-period of the FET 108 becomes short, and energy stored in the transformer 104 is reduced, the transformer 104 is controlled so that the rise of output voltage is suppressed, and a predetermined target DC voltage V is generated.

Figure 4:
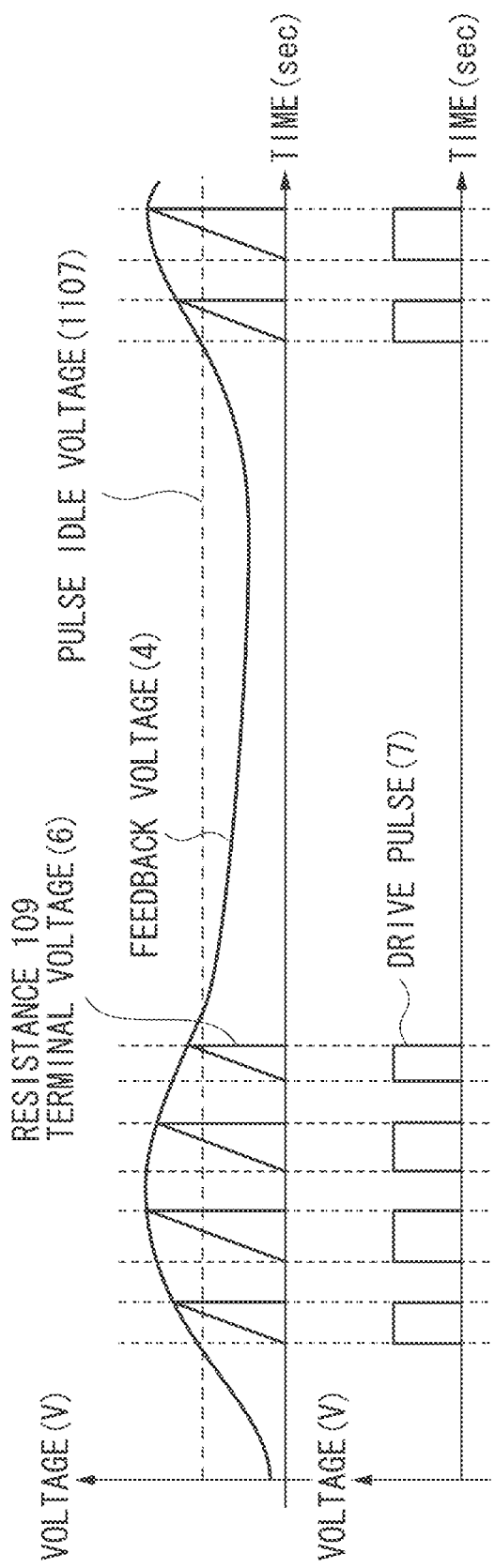
FIG. 4 illustrates an example of operation waveforms during the light-load running of the switching power source.

Next, an example of operation during the light-load running of the switching power source described in FIG. 2 is illustrated in FIG. 4. The term "during the light-load running" is a state where the load unit 120 is not operating, and power consumption of the load unit is very small, and the switching power source is operating in a state where the power consumption is small (power-saving condition).

In FIG. 4, a feedback voltage, a pulse stop voltage, a terminal voltage of the current detection resistance 109 as a voltage value determined according to electrical current flowing through the primary winding 105 of the transformer, and a driving pulse are illustrated, and the IC 110 stops the driving pulse when the feedback voltage drops. When a condition turns to the light-load running, and the DC voltage V becomes high, the shunt regulator 117 allows even more current to flow. As a result, the photo LED current of the photocoupler 111 is increased and a voltage of the photo transistor side of the photocoupler 111 is lowered. As a result, the feedback voltage changes as illustrated in FIG. 4, and becomes equal to or less than a pulse stop voltage at which the driving pulse stops. Then, the IC 110 stops an output of the driving pulse from the terminal 7.

Next, since an electric current of the load unit 120 ongoingly continues to flow, a voltage accumulated at the electrolytic capacitor 115 is lowered, and an electric current of the shunt regulator 117 is decreased. As a result, the photo LED current of the photocoupler 111 is decreased, and the photo transistor current is decreased. Consequently, if the feedback voltage rises, and the feedback voltage becomes a pulse stop voltage or greater, then the IC 110 starts again an output of the driving pulse from the terminal 7.

In this way, an operation of the FET 108 during the light-load running is controlled by the IC 110, and the switching operation during the light-load running is sometimes referred to as a burst operation. During the burst operation, a time length of off-operation of a short cycle by the FET 108 is determined by a time length for releasing a voltage of the secondary side of the transformer 104, namely, an output voltage on the secondary side of the transformer 104 and an inductance on the secondary side, and the FET 108 operates at a much higher frequency than mechanical resonance frequency of the transformer 104. Hereinabove, basic operations of the switching power source according to the present exemplary embodiment have been described.

Figure 5:
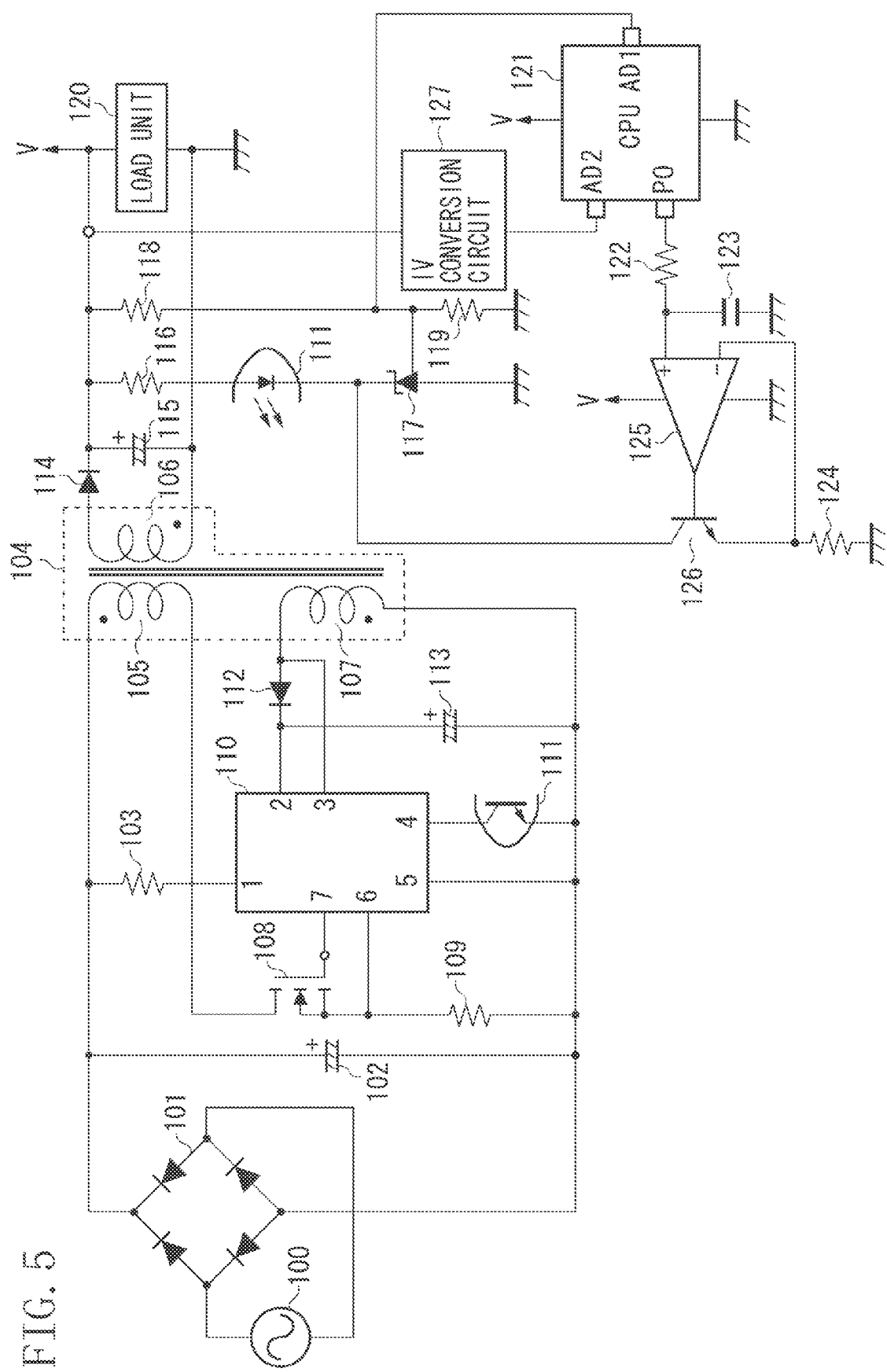
FIG. 5 illustrates circuit configuration of the switching power source according to the first exemplary embodiment.

Next, characteristics configurations and operations according to the present exemplary embodiment will be described in detail. FIG. 5 illustrates a configuration of the switching power source according to the present exemplary embodiment. In the switching power source in FIG. 5, difference from the above-described switching power source in FIG. 2 is an addition of a circuit including a microcontroller 121 (indicated as a central processing unit (CPU) in FIG. 5), resistances 122 and 124, a capacitor 123, an operational amplifier 125 as an error detector, a transistor 126, and a current-to-voltage (IV) conversion circuit 127 that converts load current on the secondary side into voltage information. In the present exemplary embodiment, it is characterized to input a signal based on a pulse width modulation (PWM) signal sent out from a digital output port PO of the CPU 121 into the feedback voltage terminal 4 of the IC 110, during the light-load running, and to perform control for varying a number of pulses in the driving pulse group which forcibly drives the FET 108.

Figure 6:
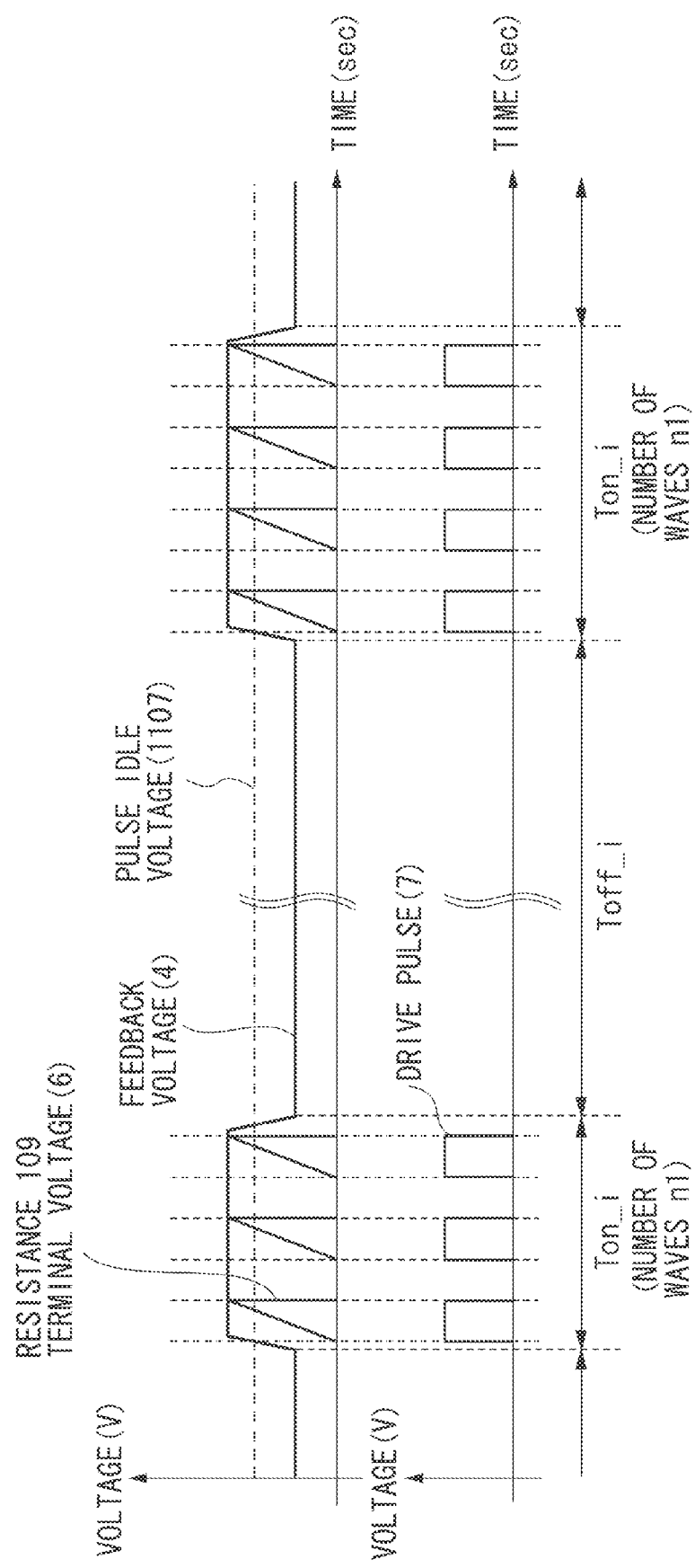
FIG. 6 illustrates operation waveforms during the light-load running of the switching power source according to the first exemplary embodiment.

FIG. 6 illustrates operation waveforms during the characteristic light-load running according to the present exemplary embodiment in the switching power source in FIG. 5. In FIG. 6, difference from FIG. 4 is that the CPU 121 controls the feedback voltage. In other words, the CPU 121 outputs the PWM signal from the digital output port PO, and drives an electrical current source that includes the resistance 124, the operational amplifier 125, and the transistor 126, by an analog voltage smoothed by the resistance 122 and the capacitor 123. Then, an output current of the current source flows through the photo light-emitting diode (LED) of the photocoupler 111. A collector terminal of the transistor 126 is wired OR connected with a cathode terminal of a shunt regulator 117, and during normal running, the CPU 121 outputs Low from the digital output port PO, and the transistor 126 is turned off.

On the other hand, during the light-load running, since the target value of the DC voltage V is lower than that during normal running, the shunt regulator 117 does not operate, and the circuit connected to the current source that includes the resistance 124, the operational amplifier 125, and the transistor 126 is configured to take the dominant role in operations. In other words, during the light-load running, the CPU 121 controls the feedback voltage according to the PWM signal output from the digital output port PO in the CPU 121, and variably controls a number of pulses in the driving pulse group generated in accordance with the control. As illustrated in FIG. 6, if a length of time Ton_i (i is an integer of one or more) during which the feedback voltage is higher than the pulse stop voltage is sustained, the number of driving pulses ni (i is an integer of one or more) can be increased.

Conversely, if a length of time Toff_i (i is an integer of one or more) during which the feedback voltage is lower than the pulse stop voltage is sustained, the driving pulse output can be turned off. The CPU 121 monitors voltages obtained by dividing the DC voltage V in proportion to the resistances 118 and 119, from an analog digital input port AD1 during the light-load running, to store desired DC voltages V, and current values, in read-only memory (ROM) (not illustrated) inside the IC 110 as information, and to control a number of driving pulses ni, and a driving pulse idle period Toff_i in accordance with a program incorporated in advance.

Figure 7:
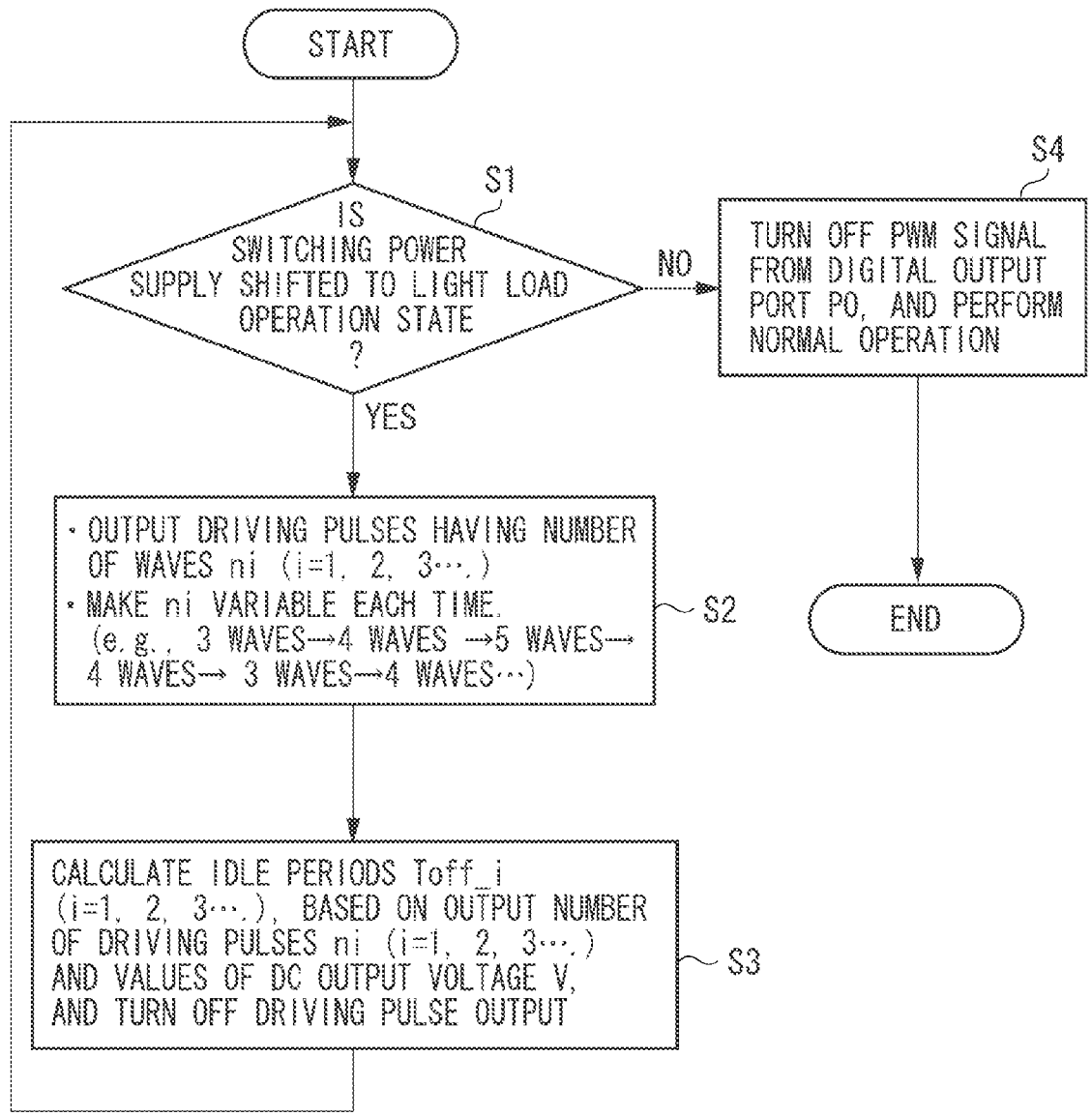
FIG. 7 illustrates a control flowchart during the light-load running of the switching power source according to the first exemplary embodiment.

FIG. 7 is the flowchart illustrating a control operation of the CPU 121 during the light-load running. First, in step S1, the CPU 121 determines whether the switching power source has shifted to the light-load running condition. As a method for determining this load condition, the load condition is determined by the CPU 121 by converting a load current on secondary side into voltage information by the IV conversion circuit 127, and inputting the voltage information into an analog digital input port AD2 in the CPU 121. As another method, a method may be used in which a controller (not illustrated) which manages other functions of an electronic device that mounts the switching power source, for example, an operation condition of the electronic device, determines that the switching power source is in the light-load running condition, based on an operation condition to which the electronic device has shifted.

Next, if the switching power source is in the light-load running condition, the CPU 121 sets a number of pulses ni in the driving pulse group to a value based on a program incorporated in advance, and performs control so that the number of pulses ni in the driving pulse group becomes the setting value. In other words, in step S2, the CPU 121 outputs the PWM signal from the digital output port PO for a length of time Ton_i, and makes the feedback voltage higher than the pulse stop voltage to output the driving pulse. In the present exemplary embodiment, the CPU 121 variably controls the number of waves so that, for example, the setting value of the number of driving pulses ni, is added or subtracted in increment or decrement of one wave, in such a manner as 3 waves→4 waves-→5 waves→4 waves→3 waves→4 waves→●●●, each time the process enters the processing condition in step S2 so that the number of pulses becomes 4 waves on average.

Next, the CPU 121 calculates the driving pulse idle period Toff_i, based on the information of the output number of driving pulses ni, and the DC voltage V input into the analog digital input port AD1, and turns off the driving pulse output. In other words, in step S3, the CPU 121 turns off the PWM signal from the digital output port PO only for a length of the time Toff_i, and turns off the driving pulse output by making the feedback voltage lower than the pulse stop voltage. The idle period Toff_i of the driving pulse is calculated such that, for example, the DC voltage V converges on a value within a range of ±5% of the target value determined based on required specification of power consumption during the light-load running. In other words, in the processing for calculating the idle period Toff_i, if the DC voltage V is within a range of ±5% of the target value, the CPU 121 sets a value of the idle period programmed in advance as it is. If the DC voltage V is not within a range of ±5% of the target value, the CPU 121 performs calculation (correction) on the value of the idle period programmed in advance depending on the value, and accordingly increases or decreases the value.

In this way, during the light-load running of the switching power source, the CPU 121 causes the switching power source to perform the burst operation by repeating the processing in steps S1, S2, and S3 in FIG. 7, and the CPU 121 performs control to vary the number of driving pulses ni in the driving pulse group, every time, in the processing in step S2.

In step S4, if the normal running condition occurs or the conditions under which the operation condition should be shifted to the normal running condition occurs, instead of the light-load running condition, the CPU 121 turns off the PWM signal from the digital output port PO in the CPU 121, and performs feedback control of the DC voltage V during the normal running as described above. As described above, based on the flowchart in FIG. 7, the CPU 121 performs constant voltage control of the DC voltage V during the light-load running of the switching power source.

Figure 8:
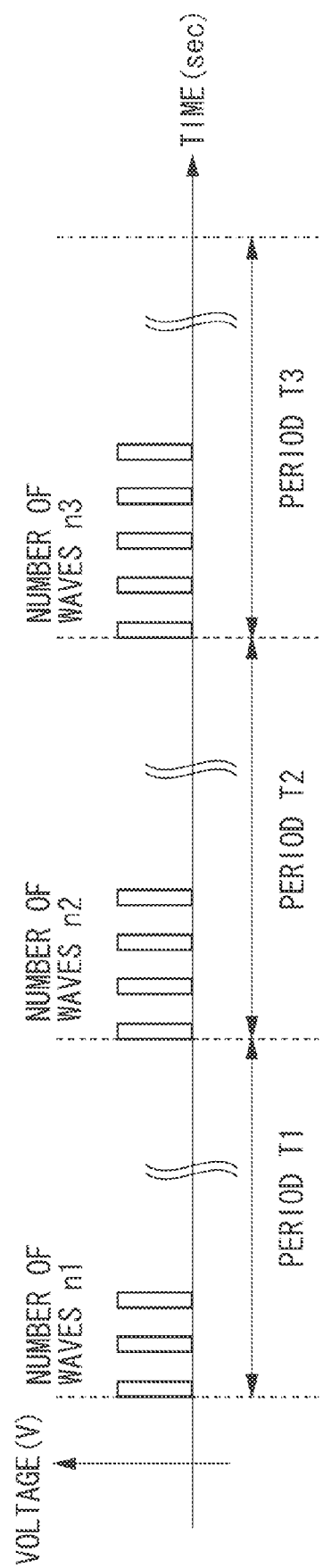
FIG. 8 illustrates a schematic configuration diagram of driving pulse groups during light-load running of the switching power source according to the first exemplary embodiment.

Next, FIG. 8 illustrates a concept of variable control of the driving pulse group during the light-load running. As illustrated in FIG. 8, the CPU 121 performs the burst operation during the light-load running in manner of outputting a pulse group with the number of waves ni in the period Ti, according to the flowchart in FIG. 7. In the present exemplary embodiment, the CPU 121 periodically variably controls a number of ON-times of the FET 108 at intervals in such a manner that, for example, the number of pulses (number of waves) be varied as 3 waves→0.4 waves→0.5 waves→4 waves→0.3 waves→4 waves→●●●.

Figure 9:
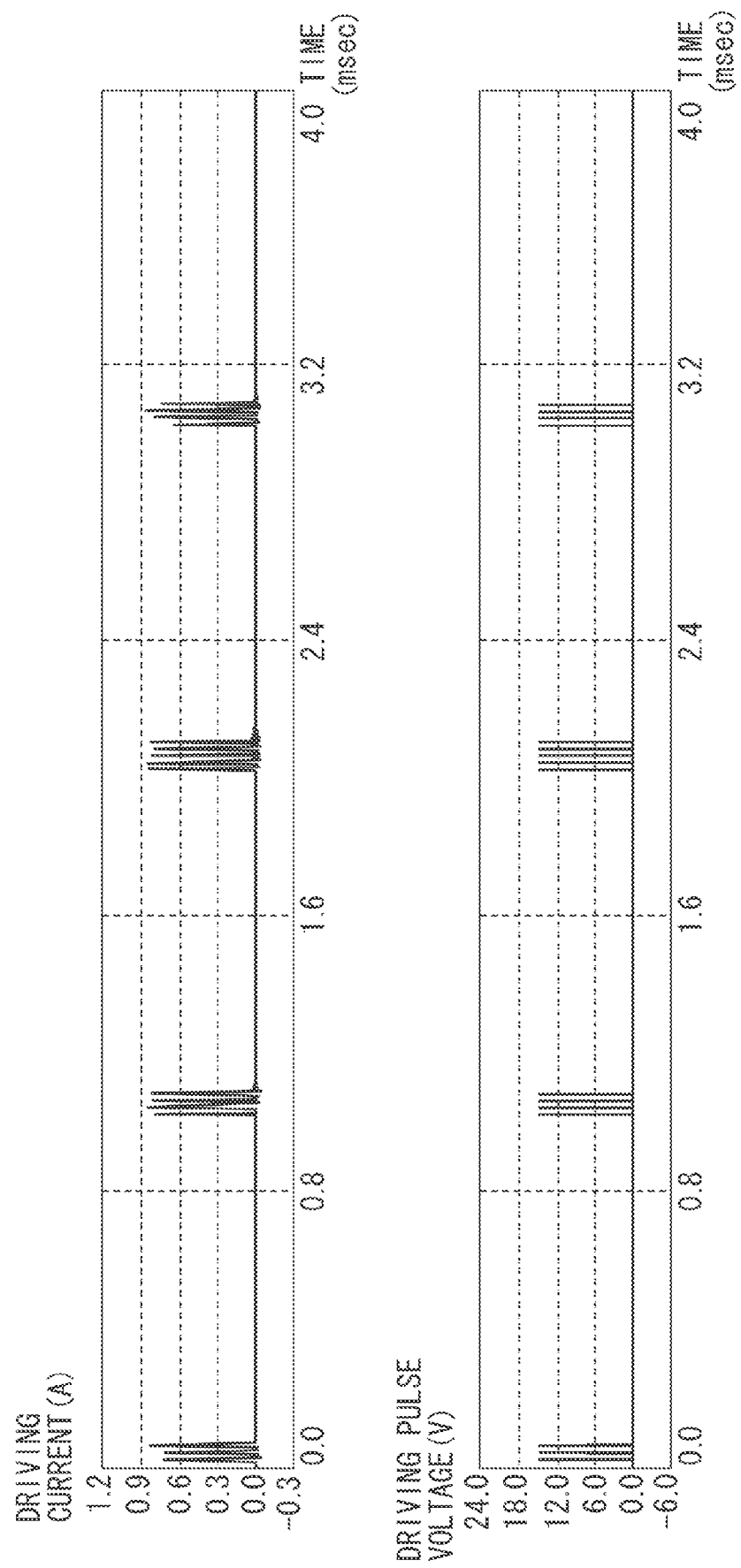
FIG. 9 illustrates transformer driving current waveforms and driving pulse waveforms during light-load running of the switching power source according to the first exemplary embodiment.

More specifically, FIG. 9 illustrates transformer driving current waveforms and driving pulse waveforms when the CPU 121 performs variable control (sometimes referred to as scattered control) of the number of driving pulses, such that the number of pulses in the driving pulse group (equal to the number of ON-times of the FET 108) is added or subtracted in increment or decrement of 1 wave so that the number of pulses becomes 4-waves on average.

FIGS. 9A and 9B illustrate transformer driving current waveforms and driving pulse waveforms respectively when the FET 108 is driven by the driving pulse group in a cycle of 1 msec (cycles T1, T2, and T3 in FIG. 8), ON-period of 2.5 μsec, and OFF-period of 20 μsec between the driving pulses. In FIG. 9A, the vertical axis represents transformer driving current (A), and the horizontal axis represents time (msec). In FIG. 9B, the vertical axis represents driving pulse voltage (V), and the horizontal axis represents time (msec).

Figure 10:
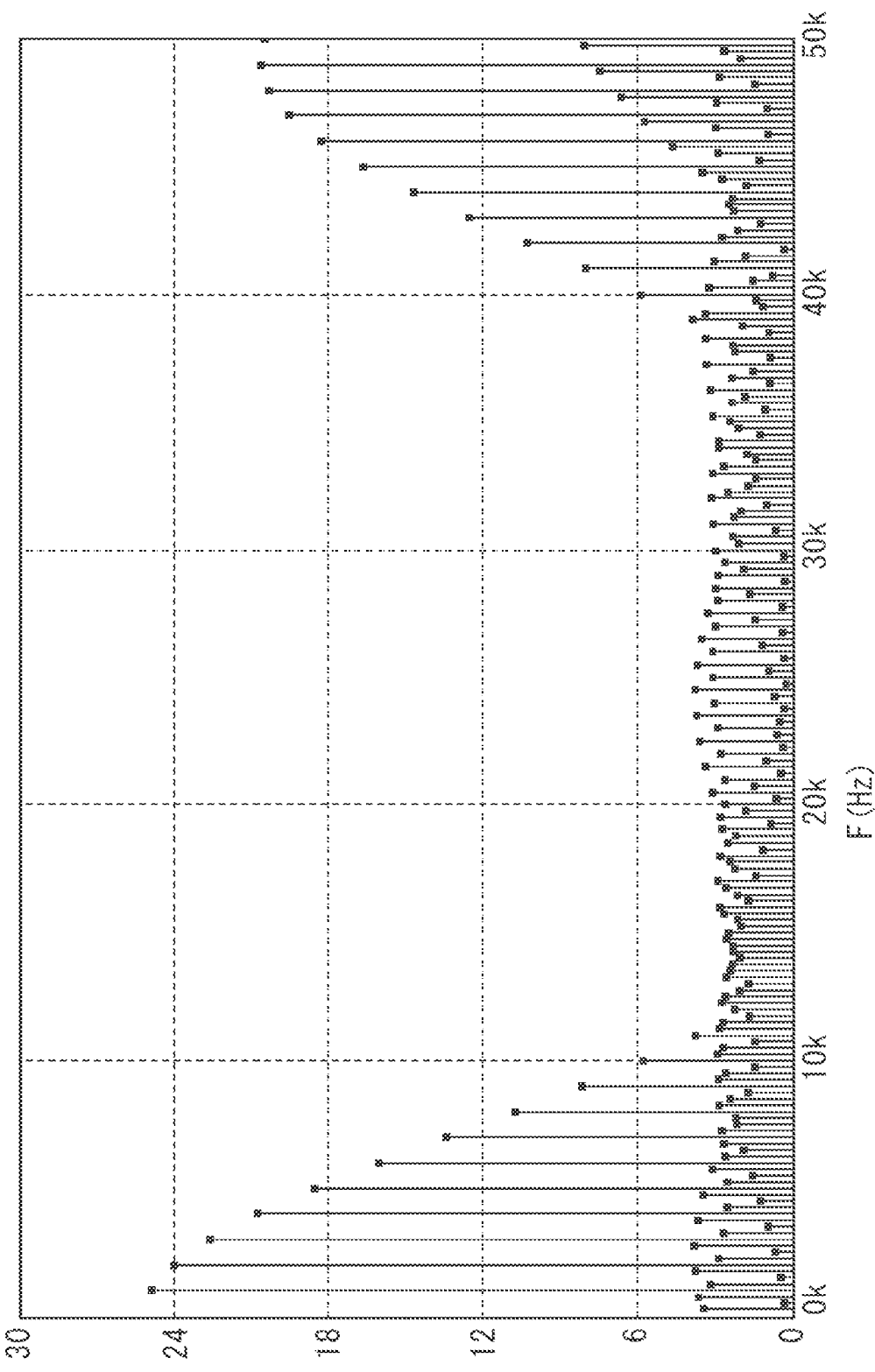
FIG. 10 illustrates frequency characteristics of transformer driving current waveforms during the light-load running of the switching power source according to the first exemplary embodiment.
Figure 17:
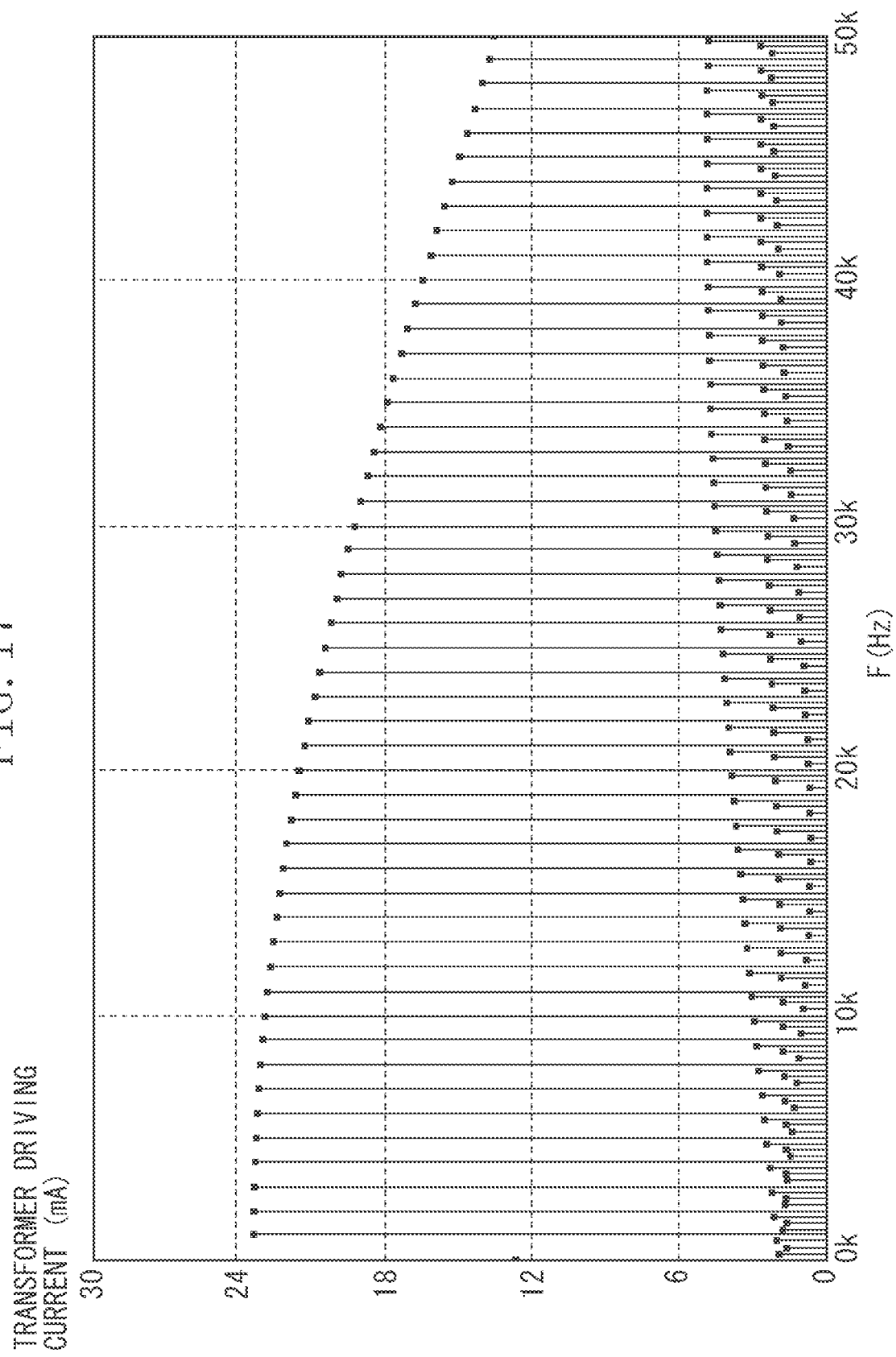
FIG. 17 illustrates frequency characteristics of the transformer driving current waveform during the light-load running of the conventional switching power source.

Further, FIG. 10 illustrates the results obtained by performing frequency analysis (fast Fourier transform analysis (FFT analysis)), on the transformer driving current waveforms in FIG. 9A. In FIG. 10, the vertical axis represents transformer driving current (mA), and the horizontal axis represents frequency (Hz). Compared with the FFT spectrum when switching operation is performed with the driving pulse of 1 wave during the light-load running described in FIG. 17, in the above-described conventional example, it can be seen that harmonic wave components are canceled each other as its effect, and a level of the spectrum is reduced as to a wide range of frequency bands, as illustrated in FIG. 10.

In this way, a level of the FET spectrum can be reduced by variably controlling the number of driving pulses input into the transformer with respect to each cycle of the burst operation. When per wave of the driving pulse, E is a voltage input into the transformer, t is ON-period, L is a primary side inductance, I is a primary side inductance current, and U is energy accumulated in the transformer, the following equation is generally established:

$$Et = LI \quad \text{(Equation 1)}$$

$$U = (½) \times L \times (I^2) = (E^2) \times (t^2)/(2 \cdot L) \quad \text{(Equation 2)}$$

From the equation 2, in order to equalize energy U1 by the driving pulse of 1 wave and energy U4 by the driving pulse group of average 4 waves, it can be seen that it is only necessary to set ON-period of the FET 108 by the driving pulse group of average 4 waves to ½ of ON-period t of the FET 108 by the driving pulse of 1 wave.

Therefore, the switching power source is driven so that average energy per unit time input into the transformer 104 becomes equal to each other in an operation of the driving pulse of 1 wave illustrated in FIG. 16 and an operation of variably controlling the number of driving pulses illustrated in FIG. 9. (In order to facilitate comparisons in each other's operation, the switching power source is driven under the conditions under which a load voltage and a current on the secondary side of the switching power source become equal).

Figure 11:
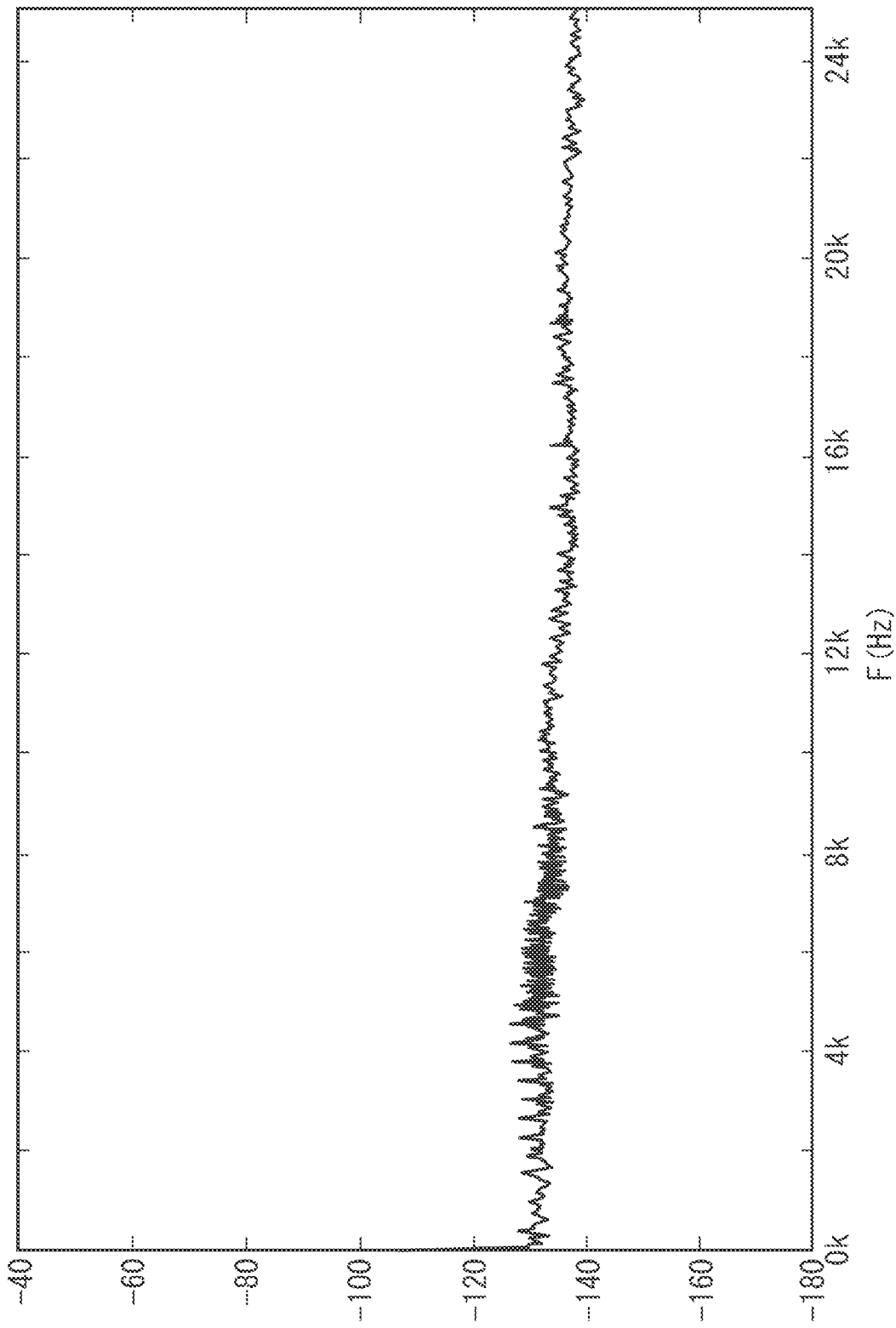
FIG. 11 illustrates sound pressure level of the beat sound of the transformer during the light-load running of the switching power source according to the first exemplary embodiment.

Next, similar to the above-described conventional example, as illustrated in FIG. 9, the transformer in which mechanical resonance frequency characteristics has a High resonance level in a frequency band around 18 kHz, peaking at 18 kHz, is driven by supplying a driving pulse group in a cycle of 1 msec, ON-period of 2.5 μsec and OFF-period of 20 μsec between the driving pulses to the FET 108. A sound pressure level of the beat sound produced from the transformer 104 at this time is illustrated in FIG. 11. In FIG. 11, the vertical axis represents sound pressure level (dB) of the beat sound of the transformer 104, and the horizontal axis represents frequency (Hz).

Figure 18:
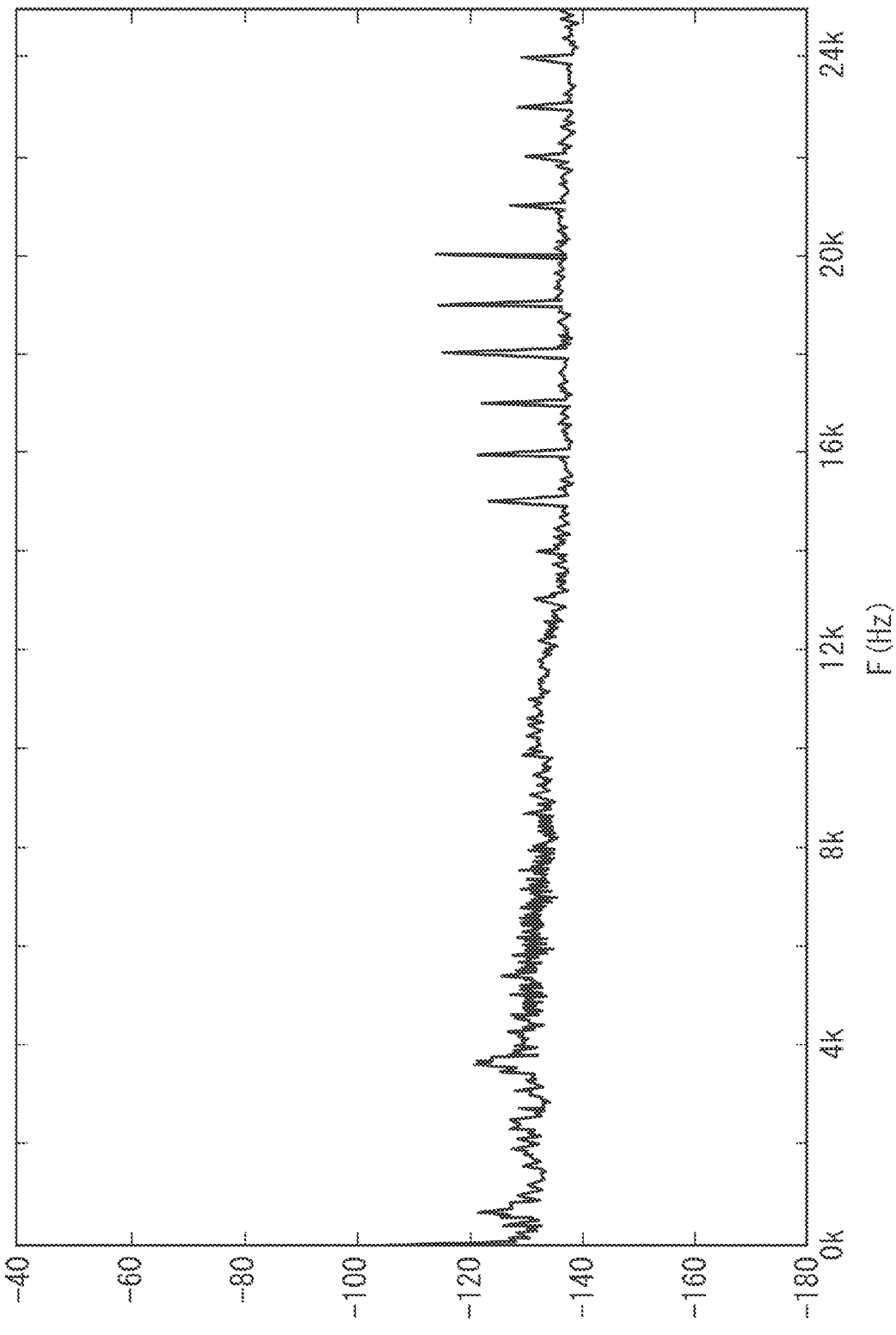
FIG. 18 illustrates sound pressure level of the beat sound of the transformer during the light-load running of the conventional switching power source.

When FIG. 11 corresponding to the present exemplary embodiment and FIG. 18 corresponding to the conventional example are compared with each other, it can be seen that the sound pressure level is reduced, and a beat sound which is disagreeable to the ear of the transformer is reduced, in the case of variably controlling the number of driving pulses according to the present exemplary embodiment, compared with the case where the switching power source is driven at the driving pulse of 1 wave as in the conventional way. More specifically, when a sound pressure level in FIG. 18 and a sound pressure level in the present exemplary embodiment are compared with each other, it can be found that reduction of about −15 dB to −20 dB can be obtained as its effect.

The operation of variably controlling the number of pulse waves in the driving pulse group according to the present exemplary embodiment described above, as illustrated in FIG. 10, has a benefit of reducing a level of the FFT spectrum of the driving current waveforms of the transformer as to a wide range of frequency bands. Therefore, when the transformer having mechanical resonance frequency characteristics in a wide range of frequency bands is used, the beat sound of the transformer can be reduced. When the number of driving pulses is increased too much which varies within the driving pulse group, the switching losses are increased. Therefore, as illustrated in the present exemplary embodiment, it is desirable that the driving pulse group is generated by the driving pulses with varying number of waves around 3 waves to 5 waves.

As described above, variable patterns of the number of driving pulses for each cycle of the burst operation have values enough to prevent an efficiency of the switching power source from degrading. The values are programmed in advance in a ROM (not illustrated) of the CPU 121. Further, the feature of the present exemplary embodiment is to forcibly control the feedback voltage during the light-load running of the switching power source, thereby varying a number of pulses in the driving pulse group of the FET 108. Further, instead of a method using the CPU 121 as illustrated by way of example in the present exemplary embodiment, switching between the numbers of pulses by a hardware circuit may be used.

Hereinabove, according to the present exemplary embodiment, the beat sound of the transformer is reduced by varying the number of pulses for each cycle of the burst operation during the light-load running of the switching power source. Thus, without increasing the transformer size, and without increasing switching losses, through this configuration, it becomes possible to reduce the production of the beat sound of the transformer. In particular, since the level of the FFT spectrum of the driving current waveforms of the transformer can be reduced, as to a wide range of frequency bands, the beat sound of the transformer having mechanical resonance frequency characteristics can be reduced.

Next, a second exemplary embodiment will be described based on FIG. 12 and FIG. 13. The same reference numerals are assigned to the parts having configurations and functions similar to those in the above-described conventional example and the first exemplary embodiment, and therefore descriptions thereof will not be repeated.

Figure 12:
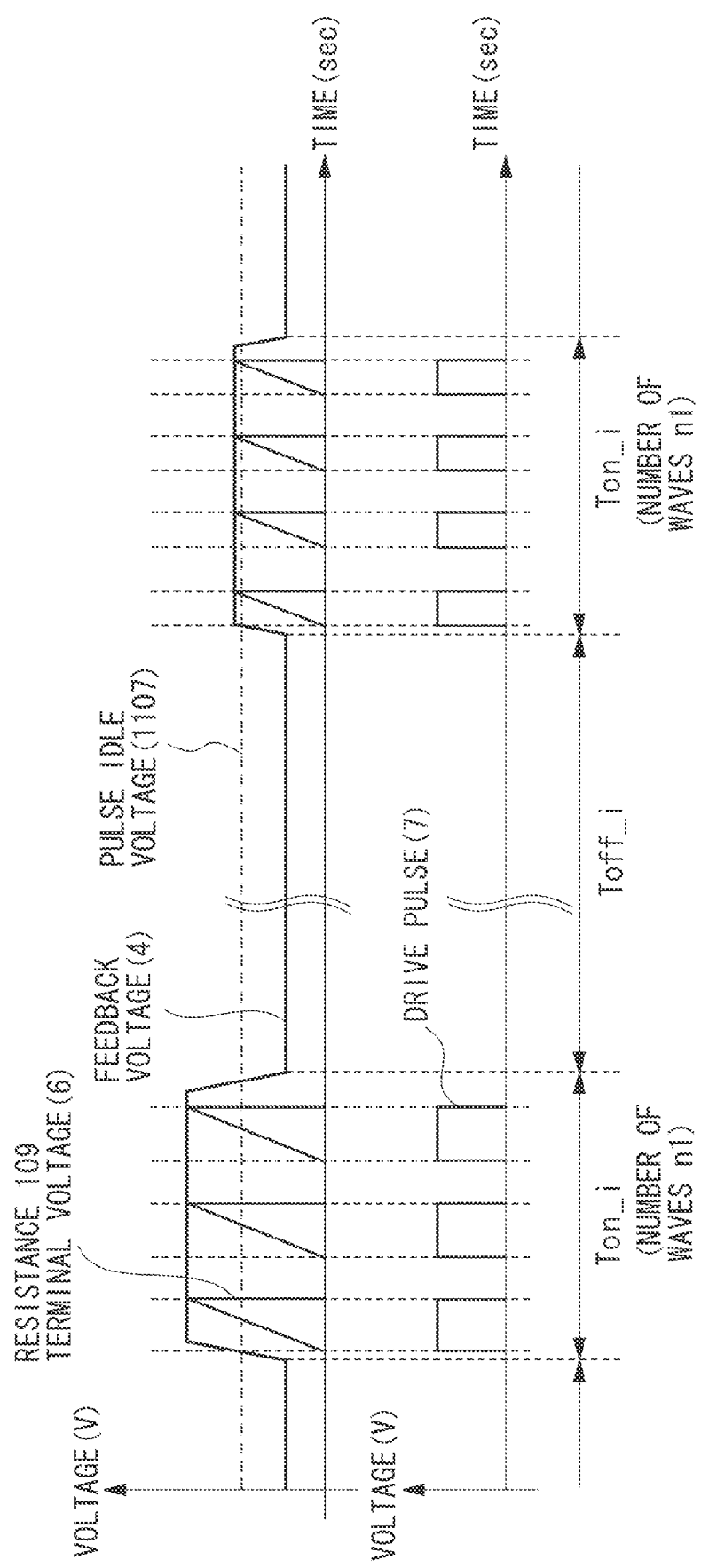
FIG. 12 illustrates waveforms of an operation during light-load running of a switching power source according to a second exemplary embodiment.

FIG. 12 illustrates operation waveforms during the light-load running indicating the features of the present exemplary embodiment. Addition of control of varying a feedback voltage level by the PWM signal which the CPU 121 outputs, is different from the operation of the first exemplary embodiment. As illustrated in FIG. 12, ON-periods in the driving pulses per wave can be controlled (can be switched between ON-periods), by adjusting a voltage level of the feedback voltage, that is, a duty ratio of the PWM signals sent out from the digital output port PO in the CPU 121. In other words, when a duty ratio of the PWM signal is increased, a voltage level of the feedback voltage becomes high. Conversely, when a duty ratio of the PWM signals decreases, a voltage level of the feedback voltage becomes low.

As a result, ON-periods in the driving pulses per wave can be set long, or can be set short, and energy accumulated in the transformer can be more flexibly adjusted. In this way, the present exemplary embodiment is characterized in that control of adjusting ON-period is added in the driving pulses per wave, and furthermore, a voltage level of the feedback voltage is varied, as a method of generating the driving pulse group described in the first exemplary embodiment.

Figure 13:
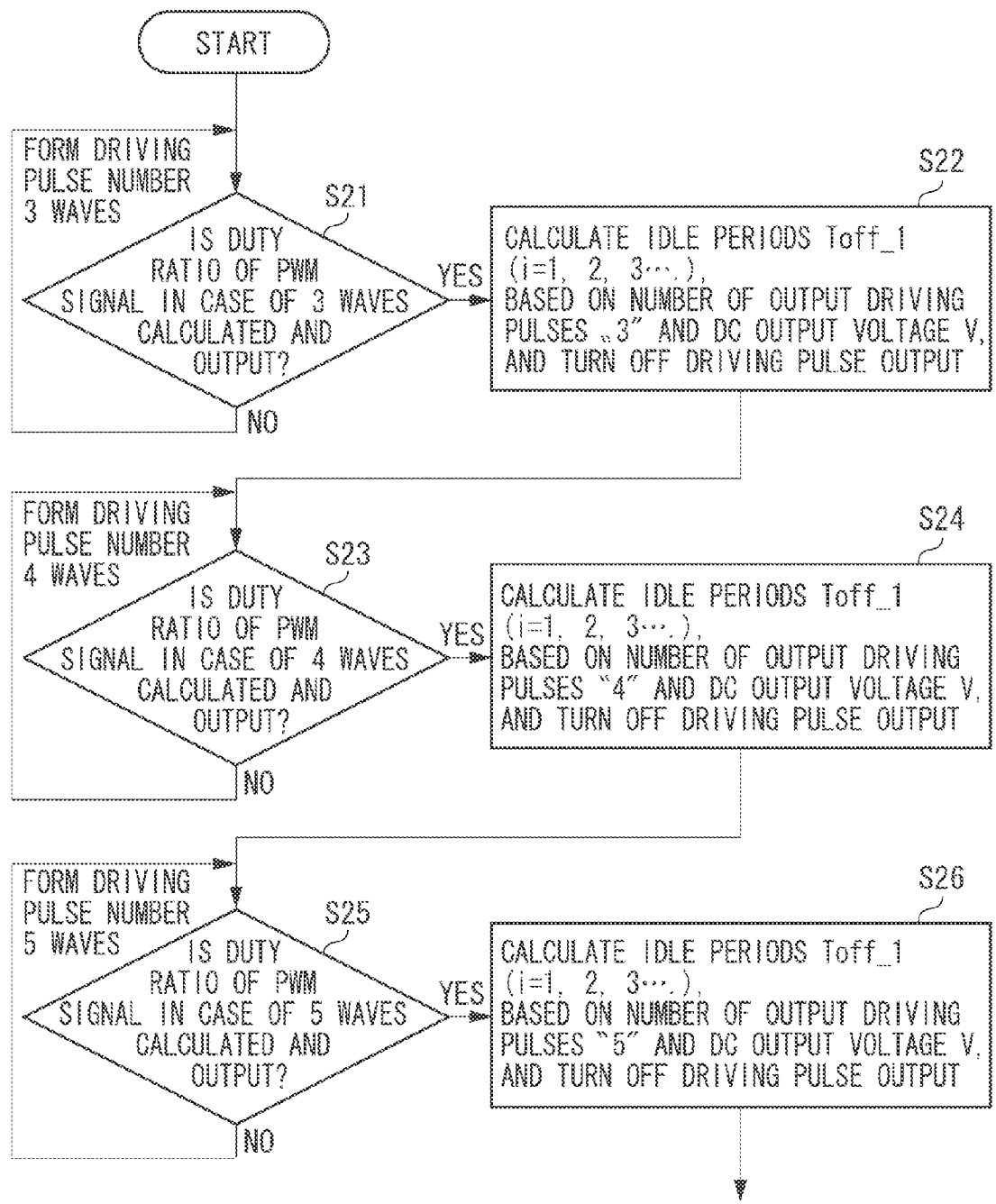
FIG. 13 illustrates a feature portion of a control flowchart during the light-load running of the switching power source according to the second exemplary embodiment.

FIG. 13 illustrates a portion of the control flowchart of the CPU 121 during the light-load running. Similar to FIG. 7 described in the first exemplary embodiment, FIG. 13 illustrates variable control of the number of pulses ni in the driving pulse group, and control of converging the DC voltage V on the target value. Further, also in the present exemplary embodiment, the number of pulses ni in the driving pulse group is added or subtracted in increment or decrement of 1 wave, in such a manner as 3 waves→4 waves→5 waves→4 waves→3 waves→4 waves→●●●, similar to the first exemplary embodiment, and variable control is performed on the number of driving pulses so that number of pulses becomes 4 waves on average. In the present exemplary embodiment, in step S2 in FIG. 7, the number of driving pulses is varied in increment of 1 pulse in such a manner as 3 waves→4 waves→5 waves, and the voltage level of the feedback voltage is varied. FIG. 13 illustrates the details of the operation. Steps S1 and S4 in FIG. 7 in the first exemplary embodiment are common in operations, and therefore descriptions and explanations of the steps of the flowchart will not be repeated.

In FIG. 13, first, when 3 waves are generated in the number of driving pulses, the CPU 121 calculates ON-periods in the driving pulses per wave to obtain a desired DC voltage V, based on the equation 1 and the equation 2. In other words, in step S21, the CPU 121 calculates and outputs a duty ratio of the PWM signal equivalent to the ON-period. Then, in step S22, the CPU 121 calculates a driving pulse idle period Toff_i and turns off the driving pulse output based on the fact that the output number of driving pulses is 3, and information of the DC voltage V input into the analog digital input port AD1. Next, in step S23, in a state where 4 waves in the number of driving pulses are generated, the CPU 121 performs the processing similar to that in step S21, and outputs the PWM signal. Then, similarly, in steps S24, S25, and S26, while providing idle periods for each cycle of the burst operation, outputs of the pulse group are repeated while varying the number of pulses.

In this way, in controlling the DC voltage V, to perform control so that harmonic wave components of the FET spectrum of the transformer driving current are canceled each other, the number of pulses in the driving pulse group is varied. Furthermore, in order to adjust energy, ON-periods in the driving pulses per wave are varied.

In the present exemplary embodiment, the CPU 121 acts as a switching unit that switches the ON-period per wave, but it is possible to implement similar functions even by a hardware circuit such as application specific integrated circuit (ASIC) instead of CPU.

In energy adjustment of generating a desired DC voltage V by a control method as described above, degree of freedom of the control method can be enhanced. In other words, parameters such as the number of driving pulses, ON-periods in the driving pulses per wave of the switching operation, and the cycles of the burst operation can be arbitrarily adjusted. Accordingly, while maintaining accuracy of the output voltage, efficiency of the switching operation during the light-load running can be enhanced, and the beat sound of the transformer can be reduced.

Third Exemplary Embodiment

Next, a third exemplary embodiment will be described based on FIG. 14. The same reference numerals are assigned to the parts having configurations and functions similar to those in the above-described conventional example and the first and second exemplary embodiments, and therefore descriptions thereof will not be repeated.

The features of the present exemplary embodiment are as illustrated in the control block of the CPU 121 in FIG. 4. Variable patterns of a number of driving pulses for each burst cycle is determined by a random number generation unit 129 provided inside the CPU 121, which is different from the first and second exemplary embodiments. In the first and second exemplary embodiments, the number of pulses ni in the driving pulse group is regularly (cyclically) added or subtracted in increment or decrement of one wave, in such a manner as 3→wave→4→wave→5→wave→4→wave→3→wave→4→wave→●●●, and the number of driving pulses is controlled to be scattered so that the number of pulses becomes a predetermined number of pulses on average. However, considering the fact that a fluctuation amount of DC voltage V during the light-load running becomes small, adjustment of energy is possible as long as the variable patterns of the number of driving pulses ni becomes the predetermined number of pulses on average, when viewed in the long run, instead of regular variable patterns of the number of driving pulses as illustrated in the first and second exemplary embodiments. Thus, in the present exemplary embodiment, the variable patterns of the number of pulses are made random. A control method when the number of pulses is made random will be described below.

In FIG. 14, voltage information of DC voltage V and information of currents flowing through loads is input into each of analog/digital input ports AD1 and AD2 in the CPU 121. The voltage information and the current information is input to an electrical power information generation part 128, and is converted into electrical power information, and is sent out to a PWM signal generation part 130. On the other hand, the random number generation part 129 generates random numbers at predetermined timing and sends them out to the PWM signal generation part 130. The random numbers are set to, for example, numerical values of around 3 to 5. The PWM signal generation part 130 determines the number of pulses ni in the driving pulse group based on the numerical values sent out from the random number generation part 129, and calculates ON-periods and burst cycles in the driving pulses per wave based on the electric power information sent out from the electric power information generation part 128. Then, the PWM signal generation part 130 outputs from the digital output port PO and stops PWM signals for generating the driving pulses, based on the processing results.

In energy adjustment of generating a desired DC voltage V by a control method as described above, degree of freedom of the control method can be enhanced. In other words, parameters such as the number of driving pulses, ON-periods in the driving pulses per wave of the switching operation, and the cycles of the burst operation can be arbitrarily adjusted. Accordingly, while maintaining accuracy of the output voltage, efficiency of the switching operation during the light-load running can be enhanced, and the beat sound of the transformer can be reduced.

Next, the modified examples of the variable patterns of the number of driving pulses for each burst cycle will be described. Even in variable patterns different from the variable patterns which have been described in the first, second, and third exemplary embodiments, it is possible to reduce (to perform control so that) harmonic wave components of the FFT spectrum of the transformer driving current (are canceled each other).

Modified Example 1

Figure 19:
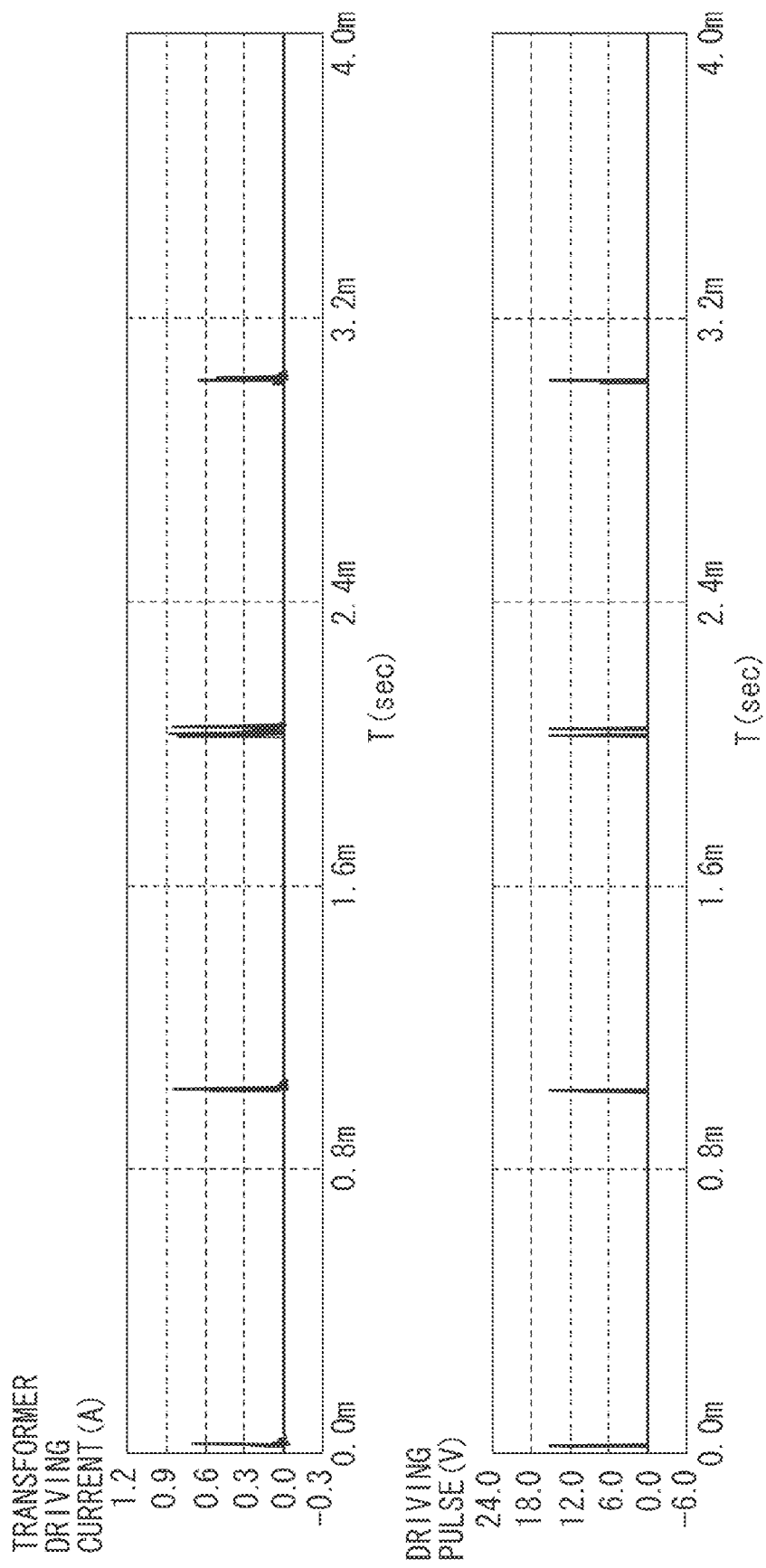
FIG. 19 illustrates pulse waveforms relating to a modified example 1 of a varying method for number of pulses.
Figure 20:
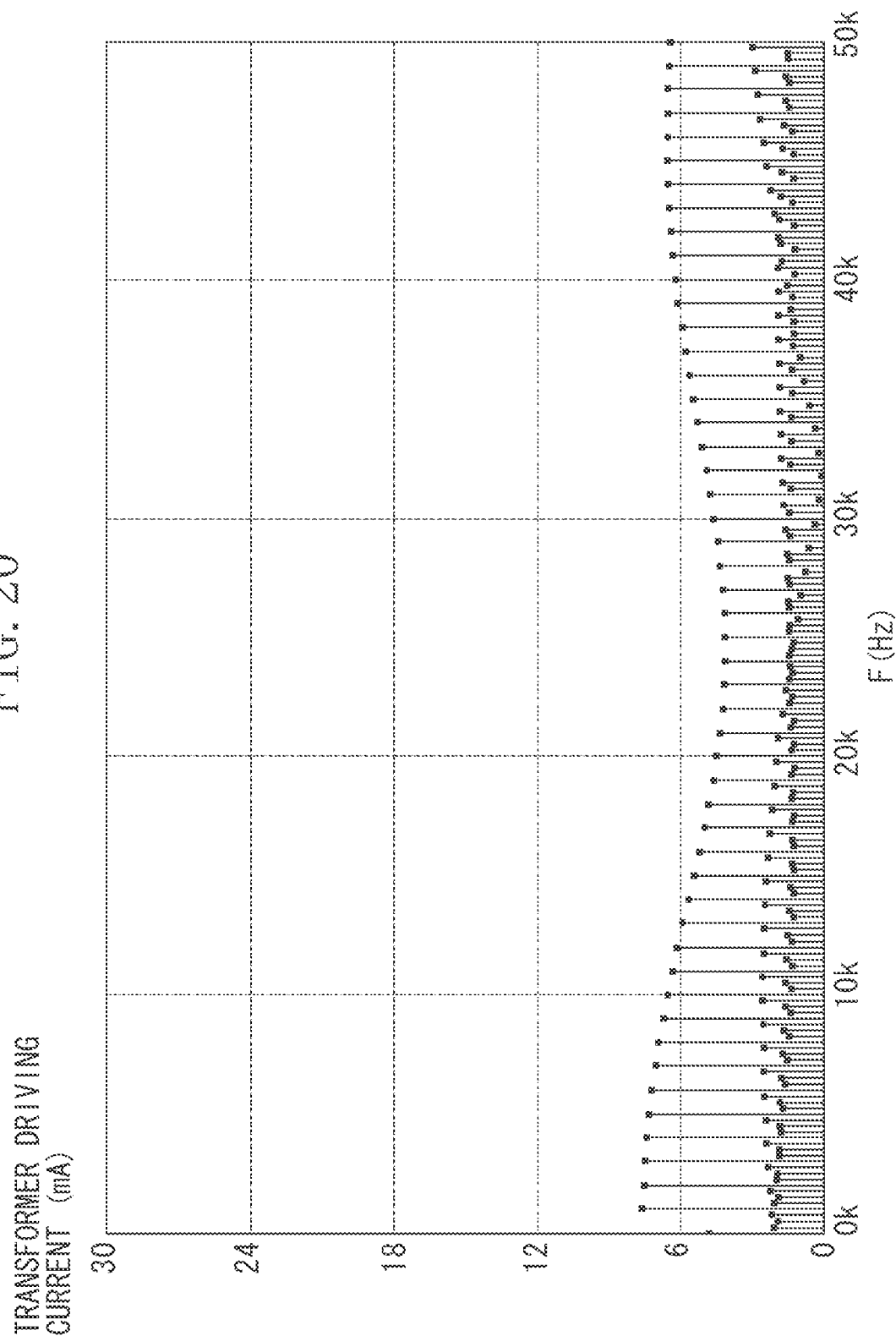
FIG. 20 illustrates frequency analysis results relating to the modified example 1 of the varying method for number of pulses.

Modified examples of a varying method for number of pulses will be described. FIG. 19 illustrates transformer driving current waveforms, and driving pulse waveforms in a case where the number of pulses (number of waves) is set to the variable patterns in such a manner as "1→wave→1→wave→2→wave→1→wave→1→wave→2→wave→●●●". In FIG. 19, transformer driving current waveforms, and driving pulse waveforms are illustrated when the FET 108 1 is driven in a driving pulse group in a cycle of 1 msec (cycles T1, T2, and T3 in FIG. 8), ON-period of 2.5 μsec and OFF-period of 20 μsec between the driving pulses. Further, the results of having performed frequency analysis (fast-Fourier transform analysis (FFT analysis)), with respect to the transformer driving current waveforms in FIG. 19 are illustrated in FIG. 20. As illustrated in FIG. 20, compared with the FFT spectrum when switching operation is performed with the driving pulse of 1-wave during the light-load running described in FIG. 17 in the above-described conventional example, there arises the effect that the harmonic wave components are canceled each other, and it can be found that the level of spectrum is reduced with respect to a wide range of frequency band.

Modified Example 2

Figure 21:
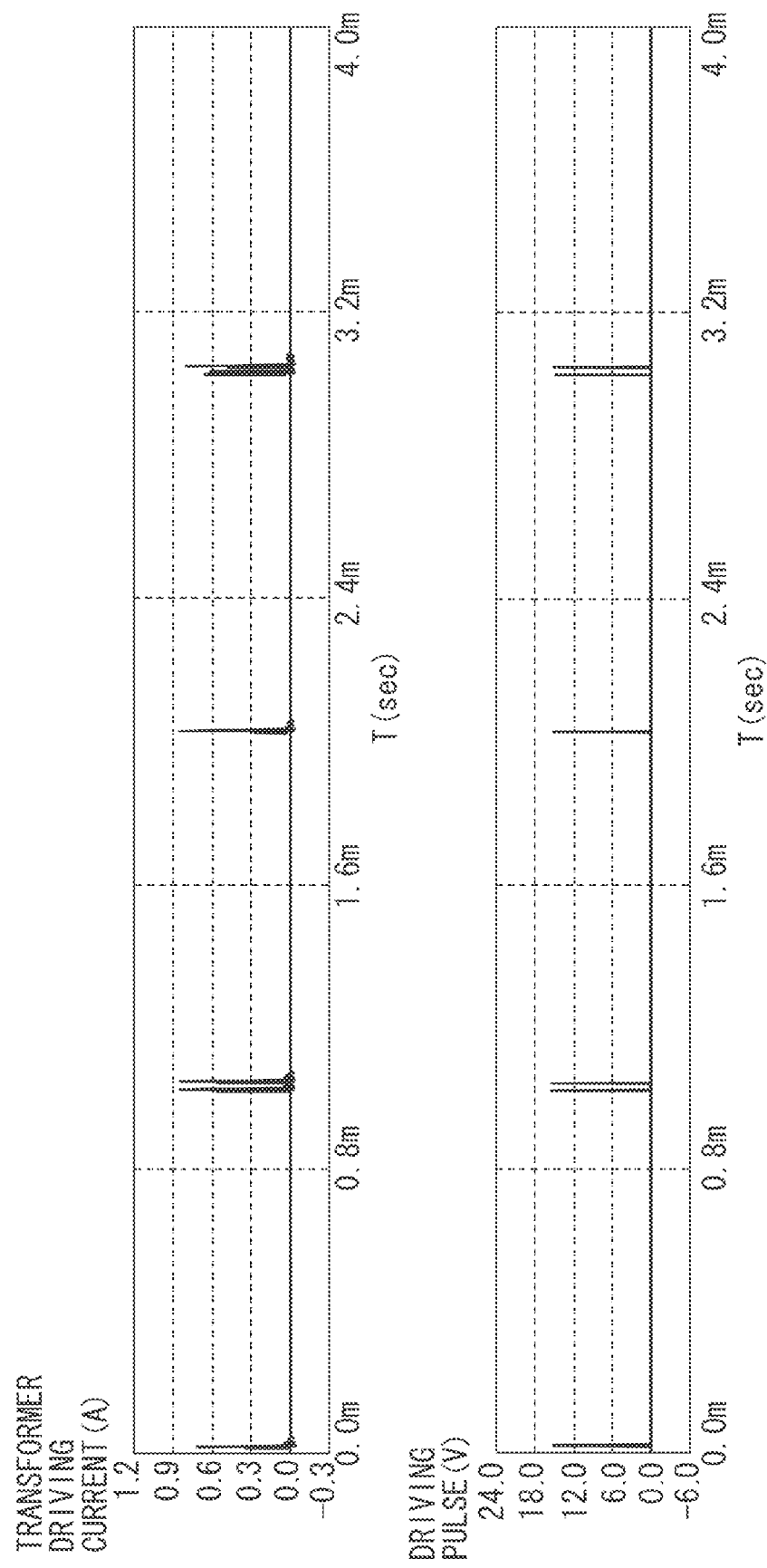
FIG. 21 illustrates pulse waveforms relating to a modified example 2 of the varying method for number of pulses.

FIG. 21 illustrates transformer driving current waveforms, and driving pulse waveforms in a case where the number of pulses (number of waves) is set to the variable patterns in such a manner as "1→wave→1→wave→2→wave→1→wave→1→wave→2→wave→●●●". Further, FIG. 22 illustrates the results of having performed frequency analysis (FFT analysis), with respect to the transformer driving current waveforms in FIG. 21. As illustrated in FIG. 22, the spectrum reduction similar to the above-described example (modified example 1) is performed. In this way, as long as the variable patterns are made such that the number of pulses is scattered to become the predetermined number of pulses on average, it can be found that the harmonic wave components are reduced.

(Application Example of Switching Power Source)

The switching power source according to the above-described first and second exemplary embodiments can be applied as a low voltage power source in the image forming apparatus such as for example, a printer, a copying machine, and a facsimile. The switching power source can be applied as power sources for power supply to a controller as a control unit in the image forming apparatus, and for power supply to a motor as a driving unit of a conveyance roller that conveys paper sheets.

Figure 14A:
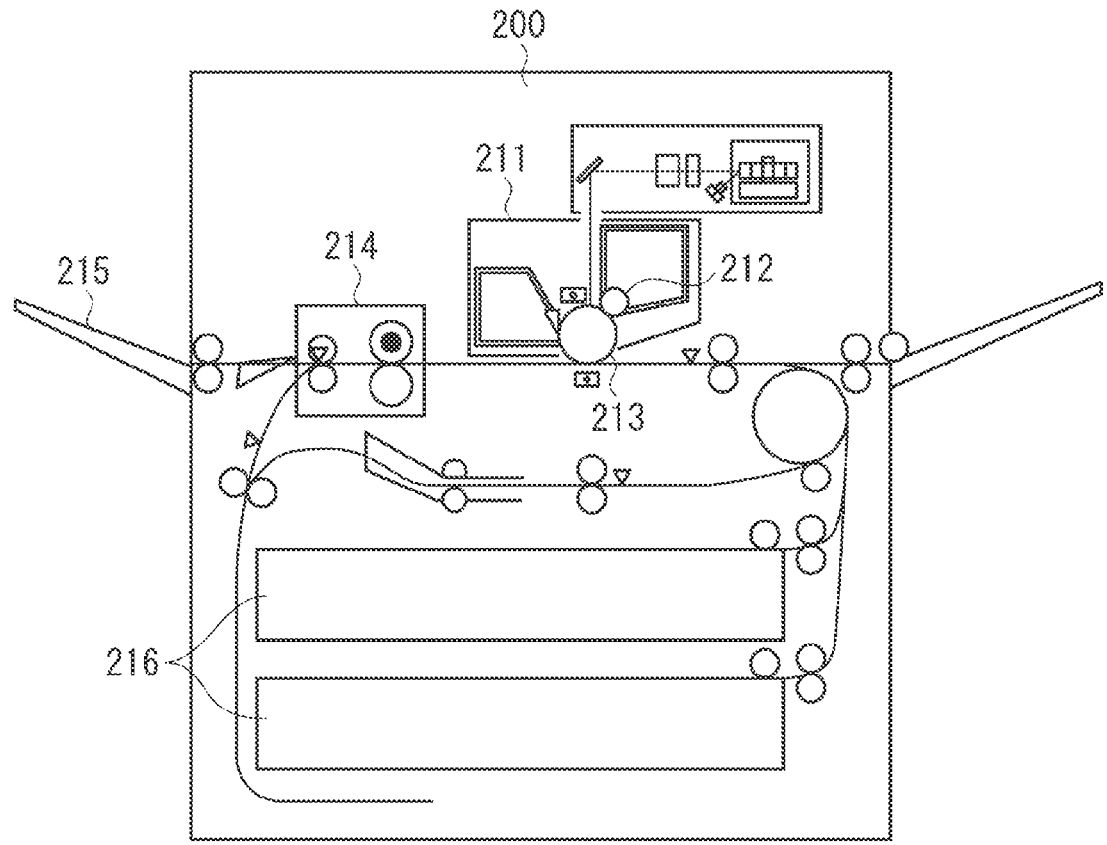
FIGS. 14A and 14B illustrates application examples of the switching power source.
Figure 14B:
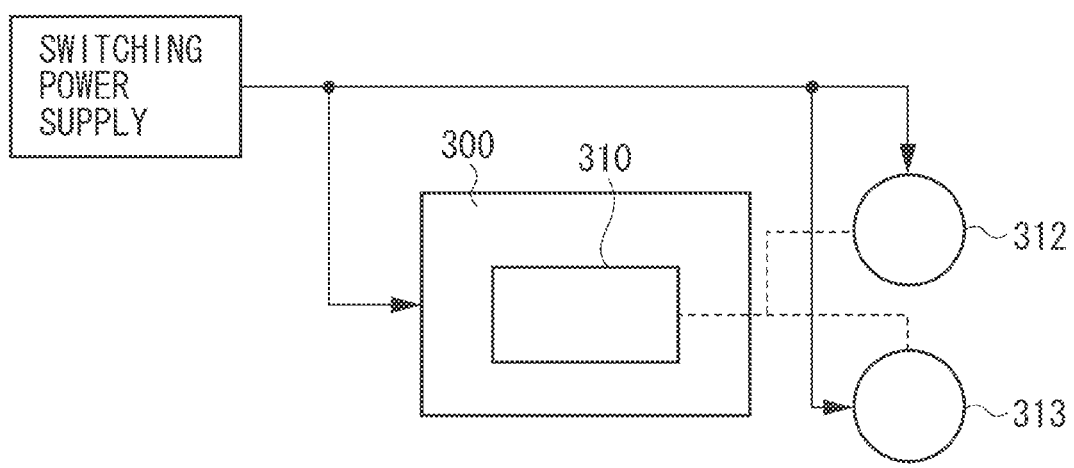
Figure 15:
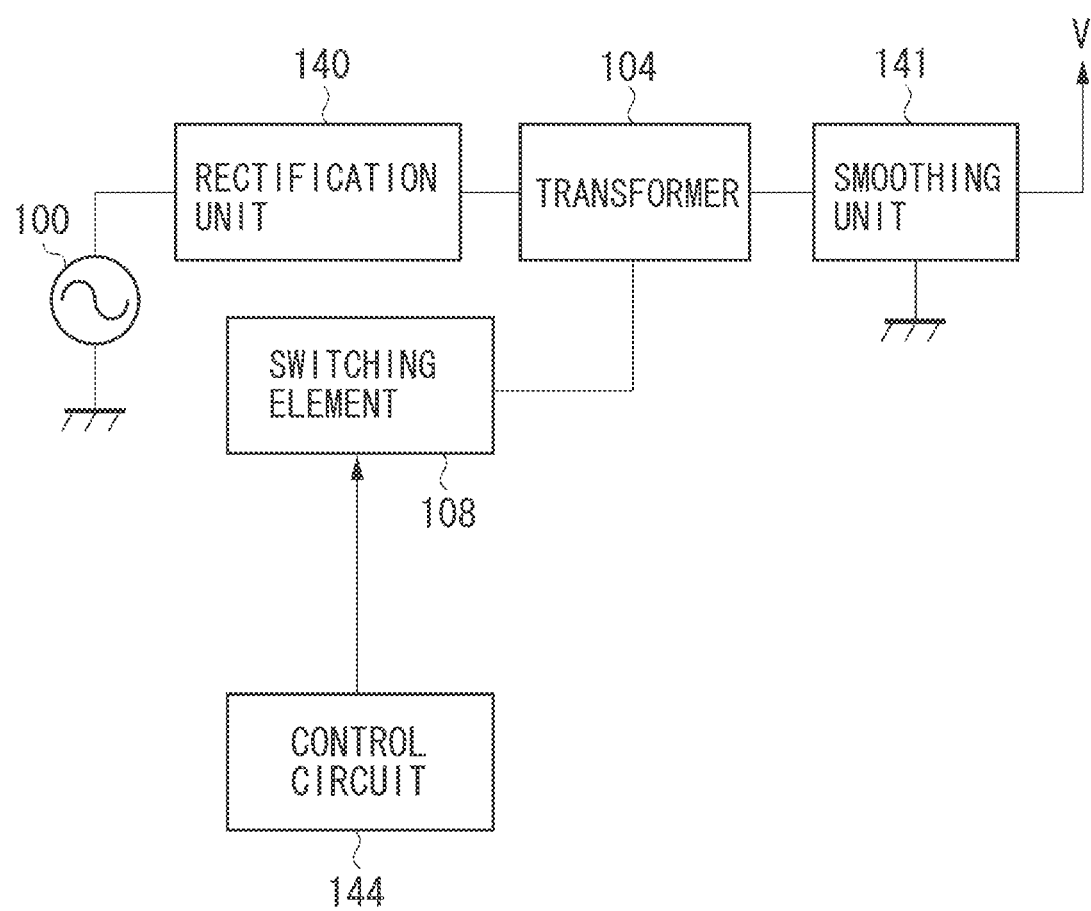
FIG. 15 illustrates a schematic configuration diagram of conventional switching power source.

FIG. 14A illustrates an outline configuration of a laser beam printer as an example of the image forming apparatus. A laser beam printer 200 is provided with a photosensitive drum 211 as an image bearing element on which a latent image is formed as an image forming unit 210, and a developing unit 212 that develops a latent image formed on the photosensitive drum with a toner. Then a toner image developed on the photosensitive drum 211 is transferred onto a sheet (not illustrated) as a recording material supplied from a cassette 216, and a toner image transferred on the sheet is fixed by a fixing device 214 and is discharged to a tray 215. Further, FIG. 14B illustrates power supply lines from a power source to a controller as a control unit of the image forming apparatus and to motors as driving units. The switching power source described above can be applied as a low-voltage power source that supplies power to the controller 300 having the CPU 310 that controls an image forming operation of the image forming apparatus, and supplies power to motors 312 and 313 as drive units for image formation. As an example of the power to be supplied, 3.3 V is supplied to the controller 300, and 24V to the motors. For example, the motor 312 is a motor for driving the conveyance roller that conveys the sheets, and the motor 313 is a motor for driving the fixing device 214. Then, the apparatus moves to an energy-saving mode according to an instruction from the controller, in a state where the image forming apparatus is not operating. At this time, also in the switching power source, voltages to be output are decreased and transition to the light-load condition occurs, and transition to the switching operation as described above occurs and the beat sound is reduced, thereby the silent image forming apparatus can be realized. The control of the switching operation described in the above-described exemplary embodiments can be applied as low voltage power sources not only to the image forming apparatus described here but also to other electronic devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2011-194965 filed Sep. 7, 2011 and 2012-173755 filed Aug. 6, 2012, which are hereby incorporated by reference herein in their entirety.

What is claimed is:

1. A switching power source comprising:
   a transformer;
   a switching unit connected to a primary winding of the transformer, and configured to perform switching of the primary winding of the transformer; and
   an output unit configured to output a voltage produced on a secondary winding of the transformer;
   wherein the switching power source is configured to operate in a first output condition in which the output unit outputs a first voltage by the switching unit continuously performing switching of the primary winding of the transformer and in a second output condition in which the output unit outputs a second voltage smaller than the first voltage by the switching unit intermittently performing switching of the primary winding of the transformer,
   wherein a switching cycle of the switching unit in the second output condition is longer than a switching cycle of the switching unit in the first output condition, and
   wherein in the second output condition, a number of ON-times of the switching unit for each switching cycle of the switching unit is periodically changed.

2. The switching power source according to claim 1, wherein the number of ON-times of the switching unit for each switching cycle of the switching unit is increased or decreased in increments or decrements of a predetermined number of times.

3. The switching power source according to claim 1, wherein the number of ON-times is changed so that an average value of a number of ON-times of each of a plurality of switching cycles of the switching unit becomes a preset number of times.

4. The switching power source according to claim 1, further comprising:
   a transmission unit configured to transmit a voltage corresponding to a difference between a voltage output from the output unit and a reference voltage, to a primary side of the transformer,
   wherein, in the second output condition, the number of ON-times of the switching unit is controlled by an output of the transmission unit.

5. The switching power source according to claim 1, further comprising:
   a changeover unit configured to change ON-periods of the switching unit,
   wherein, in the second output condition, the changeover unit changes the ON-periods of the switching unit according to the number of ON-times of the switching unit.

6. The switching power source according to claim 1, wherein the second output condition is a power-saving condition of the switching power source.

7. An image forming apparatus comprising:
an image forming unit configured to form an image;
a control unit configured to control an operation of the image forming unit; and
a switching power source configured to supply power to the control unit;
the switching power source including:
a transformer;
a switching unit connected to a primary winding of the transformer, and configured to perform switching of the primary winding of the transformer; and
an output unit configured to output a voltage produced on a secondary winding of the transformer;
wherein image forming apparatus is configured to operate in a first output condition in which the output unit outputs a first voltage by the switching unit continuously performing switching of the primary winding of the transformer and in a second output condition in which the output unit outputs a second voltage smaller than the first voltage by the switching unit intermittently performing switching of the primary winding of the transformer,
wherein a switching cycle of the switching unit in the second output condition is longer than a switching cycle of the switching unit in the first output condition, and
wherein in the second output condition, a number of ON-times of the switching unit for each switching cycle of the switching unit is periodically changed.

8. The image forming apparatus according to claim 7, wherein the number of ON-times of the switching unit for each switching cycle of the switching unit is increased or decreased in increments or decrements of a predetermined number of times.

9. The image forming apparatus according to claim 7, wherein the number of ON-times is changed so that an average value of a number of ON-times of each of a plurality of switching cycles of the switching unit becomes a preset number of times.

10. The image forming apparatus according to claim 7, further comprising:
   a transmission unit configured to transmit a voltage corresponding to a difference between a voltage output from the output unit and a reference voltage, to a primary side of the transformer,
   wherein, in the second output condition, the number of ON-times of the switching unit is controlled by an output of the transmission unit.

11. The image forming apparatus according to claim 7, further comprising:
   a changeover unit configured to change ON-periods of the switching unit,
   wherein, in the second output condition, the changeover unit changes the ON-periods of the switching unit according to the number of ON-times of the switching unit.

12. The image forming apparatus according to claim 7, wherein the second output condition is a power-saving condition of the image forming apparatus.

* * * * *